(12) United States Patent
Gravell

(10) Patent No.: US 12,157,337 B2
(45) Date of Patent: Dec. 3, 2024

(54) DIGITAL WHEEL END ASSEMBLY TEMPERATURE MONITORING SYSTEM

(71) Applicant: Equalaire Systems, Inc., Corpus Christi, TX (US)

(72) Inventor: Jonathan Gravell, San Antonio, TX (US)

(73) Assignee: Pressure Systems International, LLC, San Antonio, TX (US)

( * ) Notice: Subject to any disclaimer, the term of this patent is extended or adjusted under 35 U.S.C. 154(b) by 877 days.

(21) Appl. No.: 17/264,534

(22) PCT Filed: Jul. 31, 2019

(86) PCT No.: PCT/US2019/044560
§ 371 (c)(1),
(2) Date: Jan. 29, 2021

(87) PCT Pub. No.: WO2020/028598
PCT Pub. Date: Feb. 6, 2020

(65) Prior Publication Data
US 2021/0332849 A1    Oct. 28, 2021

Related U.S. Application Data

(60) Provisional application No. 62/712,788, filed on Jul. 31, 2018.

(51) Int. Cl.
*B60C 23/00* (2006.01)
*B60B 27/00* (2006.01)
(Continued)

(52) U.S. Cl.
CPC ...... *B60C 23/00336* (2020.05); *B60B 27/001* (2013.01); *B60B 27/02* (2013.01);
(Continued)

(58) Field of Classification Search
CPC ........ B60C 23/00336; B60C 23/00318; B60C 23/20; B60B 27/001; B60B 27/02; F16C 19/525; F16C 2326/02
See application file for complete search history.

(56) References Cited

U.S. PATENT DOCUMENTS 1,054,504 A   2/1913   Burgraff, Jr.
1,072,907 A   9/1913   Brooks
(Continued)

FOREIGN PATENT DOCUMENTS

CA   2200647 A1   9/1998
CA   2232053 A1   9/1998
(Continued)

OTHER PUBLICATIONS

International Search Report and Written Opinion Issued Nov. 4, 2019 in International Patent Application No. PCT/US2019/044560 (23 pages).
(Continued)

Primary Examiner — Eman A Alkafawi
Assistant Examiner — Dilara Sultana
(74) Attorney, Agent, or Firm — Pizarro Allen PC

(57) ABSTRACT

A wheel end high-temperature warning system for a vehicle having a wheel-end assembly mounted to an axle is described. The system may include a first temperature sensor including a sensor head configured for mounting within a spindle section of the wheel end assembly, the sensor head in a heat exchange relationship with a bearings of the wheel-end assembly. The system may further include a transmitter disposed on the axle to which the wheel-end assembly is mounted, the transmitter being configured to receive a first sensor signal from the first temperature sensor indicative of a wheel-end temperature and transmit the signal to a receiver. A vehicle data acquisition module may
(Continued)

be coupled to the receiver, the data acquisition system being programmed to receive the first sensor signal and process the signal to determine a measured temperature of the spindle.

17 Claims, 18 Drawing Sheets

(51) Int. Cl.
    *B60B 27/02*     (2006.01)
    *B60C 23/20*     (2006.01)
    *F16C 19/52*     (2006.01)

(52) U.S. Cl.
    CPC ........ *B60C 23/00318* (2020.05); *B60C 23/20* (2013.01); *F16C 19/525* (2013.01); *F16C 2326/02* (2013.01)

(56) References Cited

U.S. PATENT DOCUMENTS

| | | | |
|---|---|---|---|
| 1,083,847 A | 1/1914 | Mcdowell | |
| 1,112,596 A | 10/1914 | Burggraf, Jr. | |
| 1,165,057 A | 12/1915 | Bayly | |
| 1,205,504 A | 11/1916 | Bearce | |
| 1,800,780 A | 4/1931 | Hurtley | |
| 2,693,841 A | 11/1954 | Webster, Jr. | |
| 2,947,172 A | 8/1960 | King | |
| 3,276,503 A | 10/1966 | Kilmarx | |
| 3,380,021 A | 4/1968 | Dudar | |
| 3,645,479 A | 2/1972 | Kostroun | |
| 3,792,434 A | 2/1974 | Williams | |
| 3,848,652 A | 11/1974 | Hughes | |
| 3,889,077 A | 6/1975 | Hayashi | |
| 3,898,638 A | 8/1975 | Deane et al. | |
| 4,004,271 A | 1/1977 | Haven et al. | |
| 4,058,185 A | 11/1977 | Ploeger | |
| 4,333,304 A | 6/1982 | Greiner | |
| 4,387,931 A | 6/1983 | Bland | |
| 4,685,501 A | 8/1987 | Williams | |
| 4,700,763 A | 10/1987 | Williams | |
| 4,812,826 A | 3/1989 | Kaufman | |
| 4,883,106 A | 11/1989 | Schultz et al. | |
| 4,947,786 A | 8/1990 | Maynard et al. | |
| 5,287,906 A | 2/1994 | Stech | |
| 5,377,736 A | 1/1995 | Stech | |
| 5,381,090 A | 1/1995 | Adler et al. | |
| 5,413,159 A | 5/1995 | Olney et al. | |
| 5,429,167 A | 7/1995 | Jensen | |
| 5,492,393 A | 2/1996 | Peisker et al. | |
| 5,538,062 A | 7/1996 | Stech | |
| 5,540,268 A | 7/1996 | Mittal | |
| 5,553,647 A | 9/1996 | Jaksic | |
| 5,565,065 A | 10/1996 | Wang | |
| 5,584,773 A | 12/1996 | Kershaw et al. | |
| 5,584,949 A | 12/1996 | Ingram | |
| 5,587,698 A | 12/1996 | Genna | |
| 5,769,979 A | 6/1998 | Naedler | |
| 5,868,881 A | 2/1999 | Bradley | |
| 5,947,172 A | 9/1999 | Glotin | |
| 5,959,365 A | 9/1999 | Mantini et al. | |
| 6,046,672 A | 4/2000 | Pearman | |
| 6,105,645 A | 8/2000 | Ingram | |
| 6,131,631 A | 10/2000 | Bradley et al. | |
| 6,145,559 A | 11/2000 | Ingram, II | |
| 6,203,114 B1 | 3/2001 | Ehrlich | |
| 6,257,078 B1 | 7/2001 | Vencill | |
| 6,283,186 B1 | 9/2001 | Krisher | |
| 6,286,992 B1 | 9/2001 | Kyrtsos | |
| 6,325,123 B1 | 12/2001 | Gao et al. | |
| 6,325,124 B1 | 12/2001 | Colussi et al. | |
| 6,394,159 B1 | 5/2002 | Cobb | |
| 6,394,556 B1 | 5/2002 | Ingram | |
| 6,401,743 B1 | 6/2002 | Naedler | |
| 6,425,427 B1 | 7/2002 | Stech | |
| 6,435,238 B1 | 8/2002 | Hennig | |
| 6,546,892 B2 | 4/2003 | Kelly, Jr. et al. | |
| 6,668,888 B1 | 12/2003 | Beesley et al. | |
| 6,670,890 B2 | 12/2003 | Kyrtsos et al. | |
| 6,680,672 B2 | 1/2004 | Borugian | |
| 6,698,482 B2 | 3/2004 | Hennig et al. | |
| 6,759,963 B2 | 7/2004 | Hayes | |
| 6,892,778 B2 | 5/2005 | Hennig et al. | |
| 6,938,658 B2 | 9/2005 | Jarrett et al. | |
| 7,273,082 B2 | 9/2007 | White et al. | |
| 7,302,979 B2 | 12/2007 | Davison et al. | |
| 7,306,020 B2 | 12/2007 | Beverly et al. | |
| 7,416,005 B2 | 8/2008 | Hennig et al. | |
| 7,652,562 B2 | 1/2010 | White et al. | |
| 7,690,412 B1 | 4/2010 | Jenkinson et al. | |
| 8,186,403 B2 | 5/2012 | Sonzala et al. | |
| 8,191,594 B2 | 6/2012 | Saadat | |
| 8,594,900 B2 | 11/2013 | Couch et al. | |
| 8,910,683 B2 | 12/2014 | Hennig | |
| 8,919,401 B2 | 12/2014 | Sonzala et al. | |
| 9,346,330 B2 | 5/2016 | Musgrave et al. | |
| 9,370,974 B2 | 6/2016 | Knapke et al. | |
| 9,415,759 B2 | 8/2016 | Greene et al. | |
| 9,440,632 B2 | 9/2016 | Bennett | |
| 9,616,708 B2 | 4/2017 | Takahashi | |
| 9,636,954 B2 | 5/2017 | Therber et al. | |
| 9,636,956 B2 | 5/2017 | Xu | |
| 9,731,549 B2 | 8/2017 | Mock et al. | |
| 9,933,337 B2 | 4/2018 | White et al. | |
| 10,094,418 B2 | 10/2018 | Wallmeier et al. | |
| 10,186,091 B2 | 1/2019 | Ellis | |
| 10,739,204 B1 | 8/2020 | Duryea | |
| 2001/0030466 A1 | 10/2001 | Ehrlich et al. | |
| 2002/0185052 A1 | 12/2002 | Kelly, Jr. et al. | |
| 2004/0000364 A1 | 1/2004 | Hennig | |
| 2004/0173296 A1 | 3/2004 | White | |
| 2005/0052074 A1* | 3/2005 | Hennig | B61K 9/04 |
| | | | 301/124.1 |
| 2006/0017554 A1 | 1/2006 | Stewart et al. | |
| 2006/0156802 A1 | 7/2006 | Cohen | |
| 2006/0207705 A1 | 9/2006 | Davison et al. | |
| 2007/0227640 A1 | 6/2007 | Ingram | |
| 2008/0084289 A1* | 4/2008 | White | B61K 9/04 |
| | | | 374/E13.01 |
| 2009/0283190 A1 | 11/2009 | Padula et al. | |
| 2009/0284362 A1 | 11/2009 | Wilson et al. | |
| 2010/0315204 A1 | 12/2010 | Kamel | |
| 2012/0212039 A1* | 8/2012 | Sonzala | B60C 23/00363 |
| | | | 301/124.1 |
| 2015/0203032 A1 | 7/2015 | Honig et al. | |
| 2015/0375563 A1 | 12/2015 | Takahashi | |
| 2016/0009169 A1 | 1/2016 | Biderman et al. | |
| 2016/0207353 A1 | 1/2016 | Mock | |
| 2016/0273581 A1 | 4/2016 | Wallmeier | |
| 2017/0276570 A9 | 9/2017 | White et al. | |
| 2018/0232966 A1 | 8/2018 | Ellis | |
| 2018/0281513 A1 | 10/2018 | Dharaiya et al. | |
| 2018/0281532 A1 | 10/2018 | Ramsubagh et al. | |
| 2018/0330556 A1 | 11/2018 | Roder et al. | |
| 2018/0370280 A1 | 12/2018 | Akbarian et al. | |
| 2019/0359015 A1 | 11/2019 | Ramsubagh et al. | |
| 2019/0359196 A1 | 11/2019 | Engelbert et al. | |
| 2020/0130436 A1 | 4/2020 | Root et al. | |
| 2020/0130437 A1 | 4/2020 | Root et al. | |
| 2020/0134939 A1 | 4/2020 | Schell et al. | |
| 2020/0164685 A1 | 5/2020 | Oh | |

FOREIGN PATENT DOCUMENTS

| | | |
|---|---|---|
| GB | 1604990 A | 12/1981 |
| WO | 2017/072143 A1 | 5/2017 |

(56) References Cited

OTHER PUBLICATIONS

European Search Report in related Application No. EP19843866 dated Apr. 4, 2022 (7 Pages).

\* cited by examiner

DIGITAL WHEEL END ASSEMBLY TEMPERATURE MONITORING SYSTEM

CROSS-REFERENCE TO RELATED APPLICATION

This application is a US national stage entry of International Patent Application No. PCT/US2019/044560 filed Jul. 31, 2019 entitled "Digital Wheel End Assembly Temperature Monitoring System," which claims priority to U.S. Provisional Patent Application No. 62/712,788 titled, "Digital Wheel End Assembly Temperature Monitoring System" filed Jul. 31, 2018. The foregoing applications are fully incorporated herein by reference.

FIELD

This application relates generally to wheel end temperature monitoring.

BACKGROUND

In the event of a failure associated with the wheel end, such as a bearing failure or brake failure, elements of the wheel end can reach high temperatures very quickly. Such high temperatures may cause tires and/or lubricant to ignite, resulting in wheel lock up or fire. Due to the intense heat caused by a wheel end failure, the wheel end may detach from the axle.

There remains a need for a system for monitoring the wheel end assembly temperature and collecting data on the temperature for immediate and long-term evaluation.

SUMMARY

Figure 1:
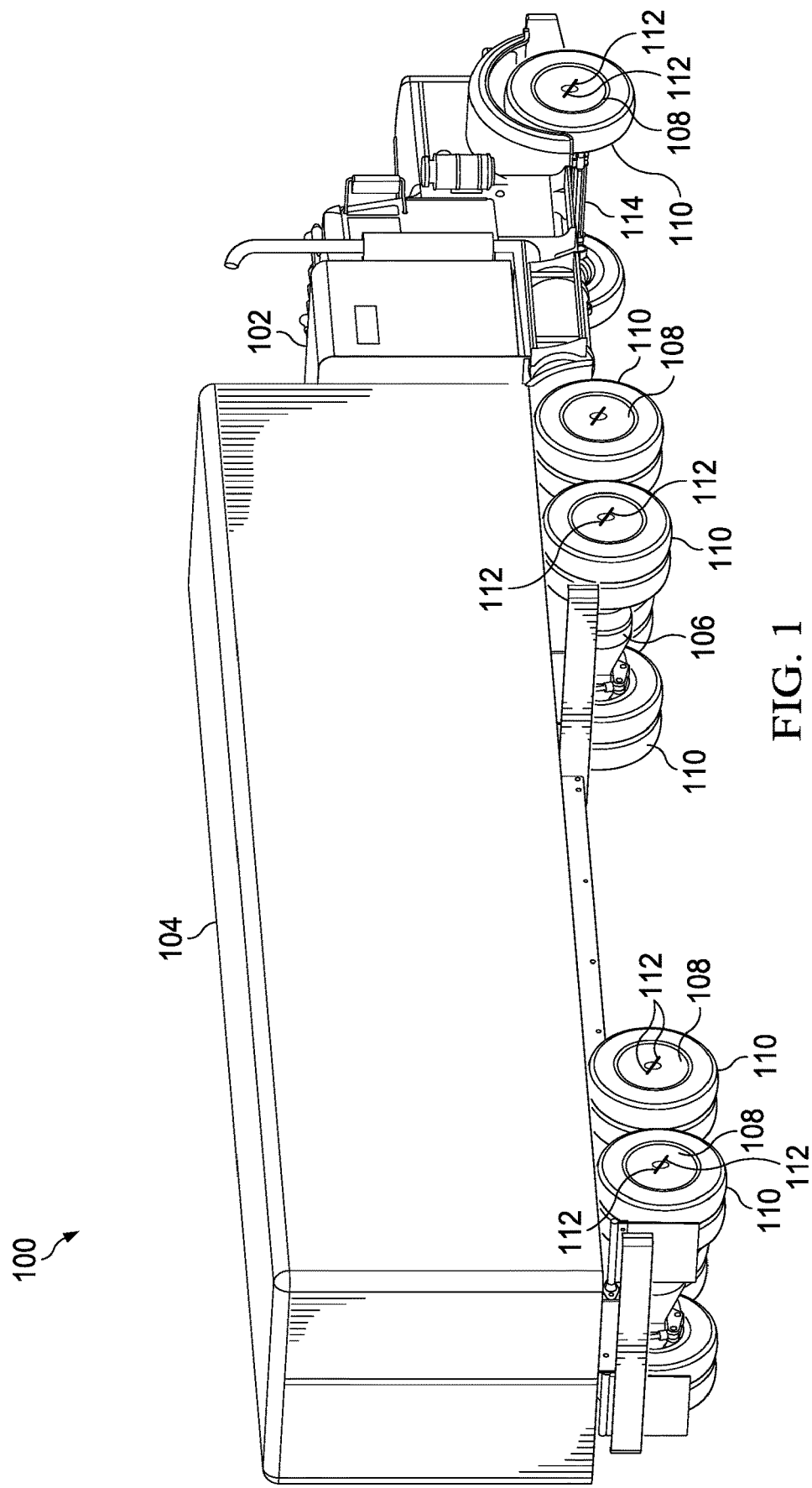
FIG. 1 illustrates a vehicle with a temperature monitoring system.

In some embodiments, a wheel end high-temperature warning system for a vehicle having a wheel-end assembly mounted to an axle is described. The system may include a temperature sensor including a sensor head configured for mounting at a spindle section of an axle near or in the wheel end assembly, the sensor head being in a heat exchange relationship with a bearing or other component of the wheel-end assembly. The system may further include a transmitter disposed on the axle to which the wheel-end assembly is mounted, the transmitter being configured to receive a sensor signal from the temperature sensor indicative of a wheel-end temperature and transmit the signal to a receiver. A vehicle data acquisition module may be coupled to the receiver, the data acquisition system being programmed to receive the sensor signal and process the signal to determine a temperature determined at the spindle. The vehicle data acquisition module may further include a display to provide a digital indication of the temperature and identify the particular wheel-end assembly associated with the temperature. The data acquisition module may further be configured to compare the detected temperature to a threshold temperature and to initiate one or more alarms if the temperature exceeds the threshold temperature. For example, the transmitter may be configured to send a high-temperature alert to a driver mobile device or fleet operator computer or other recipient by text message or email when the temperature sensor detects a temperature above a temperature threshold. The temperature threshold may be a temperature past which the wheel end is at risk of fire or failure of components, such as bearing seals.

It is an objective of some embodiments herein to provide diagnostic information pertaining to the temperature of a wheel end assembly to a system user. For example, one or more alerts or alarm faults may be initiated when one or more wheel-end assembly components reach a threshold temperature or other threshold condition. Systems herein may further identify characteristics of wheel end temperature associated with one or more alerts or alarm faults. For example, systems herein may be used to readily identify a particular wheel-end assembly initiating a fault, such as using an in-cab display included in a data acquisition module. Data acquisition modules herein may further provide an accurate digital reading of a measured temperature of the wheel end of a vehicle or component parts thereof. In some embodiments, a plurality of temperature measurements may be made using temperature probes mounted at different positions within a wheel-end assembly of a vehicle. Such information may provide for a reliable warning of a high temperature condition. Additionally, diagnostic information may be accessed by a user and used to help diagnose whether any vehicle components may be damage, should any such damage have occurred.

It is an objective of some embodiments herein to provide for an accurate measurement of temperature of components of a wheel-end assembly of a vehicle. In some of those embodiments, a sensor head of a an electrical temperature sensor may be positioned in contact with a component of a wheel-end assembly of a vehicle. The sensor head may route an electrical signal generated therein to circuitry of the sensor positioned away from or external to the wheel-end assembly. The electrical signal and a reference signal may then be used to generate a digital signal indicative of temperature. In some embodiments, more than one sensing heads may be positioned on or near more than one component or region of a wheel-end assembly of a vehicle. For example, each of a first sensor and a second sensor may be positioned within a wheel-end assembly of a vehicle. At least one of the first and second sensors may include a sensor head in a heat exchange relationship with the bearings of a wheel-end assembly.

DETAILED DESCRIPTION

As may be seen in FIG. 1, a vehicle 100 may comprise a truck 102 and a trailer 104. The truck 102 may include one or more drive axles 106 as part of the vehicle's powertrain. The truck 102 may further include a steer axle 114 having pivoting hubs that provide steering capability for the vehicle 100. The trailer 104 may include one or more fixed axles (not shown) and wheel ends. Each axle may have one or more wheels 108 mounted thereto with a tire 110 mounted to each wheel 108. Of course, other types of steerable vehicles, such as cars and buses may be provided with the high temperature warning system disclosed herein.

The vehicle 100 may be provided with a pressurized air supply (not shown) used to provide pressurized air to an optional automatic tire inflation system (indicated with air hoses 112). The high-temperature warning system (shown in more detail in FIGS. 3-19) may warn a driver when an axle 114 and/or axle wheel-end assembly reaches a predetermined temperature threshold or other threshold. A digital display of one or more measured temperatures, such as for a specific wheel-end assembly, may further be displayed. Such an axle and/or wheel-end assembly may be of a steerable or fixed configuration.

Figure 2:
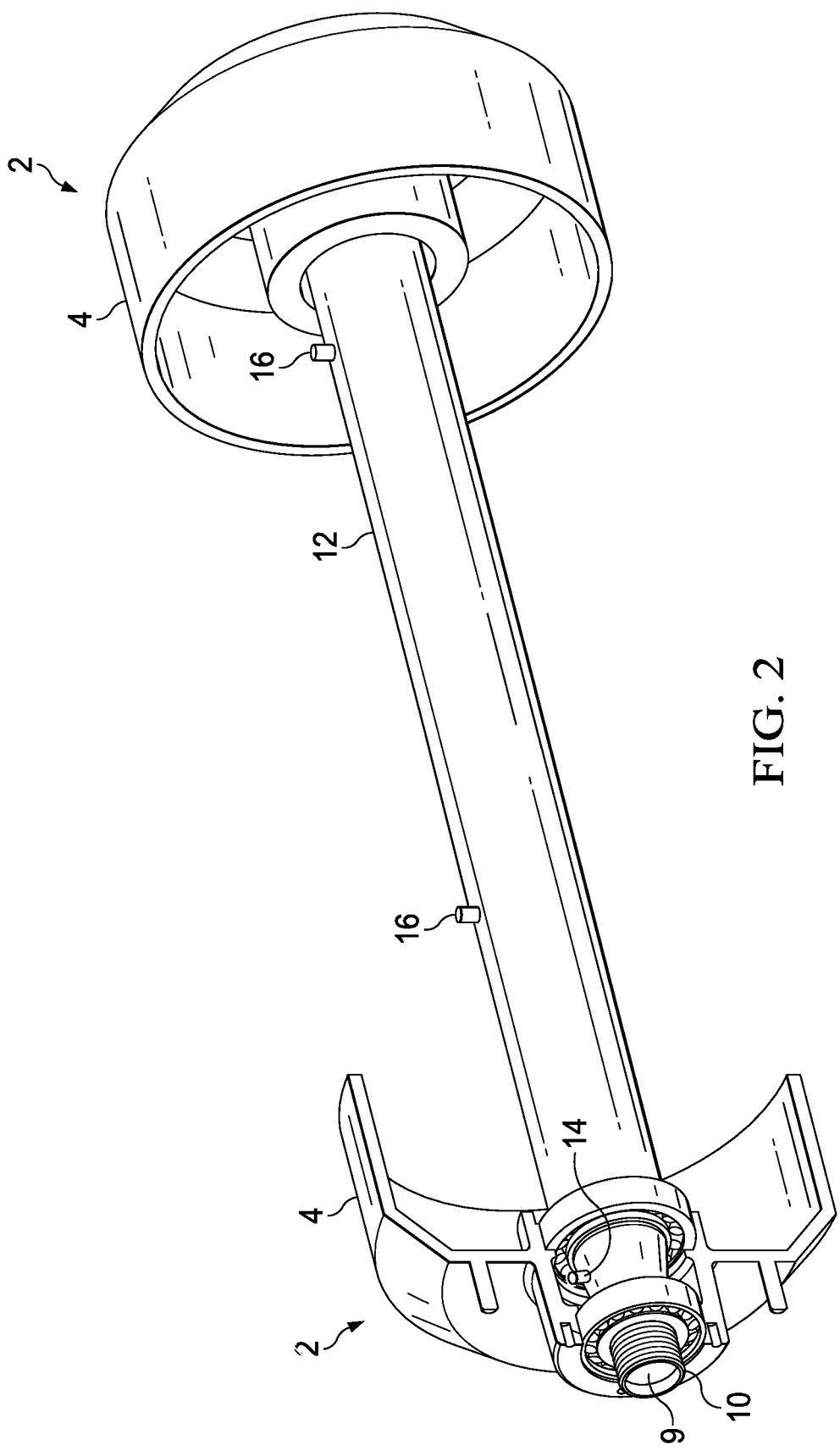
FIG. 2 illustrates a fixed axle and wheel end with mounted sensors.
Figure 3:
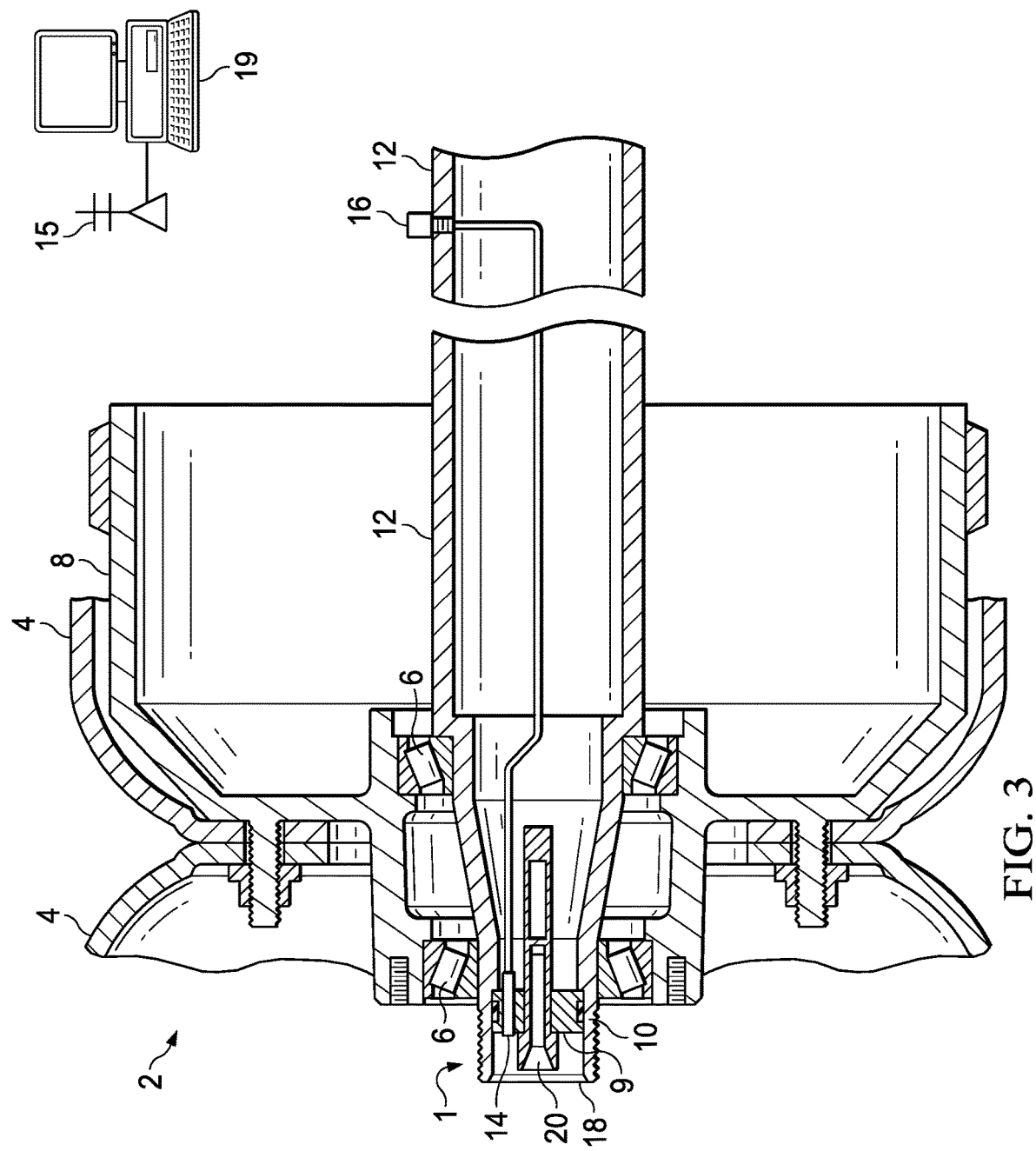
FIG. 3 illustrates a wheel end assembly including a high temperature warning system and other components that may be part of a high temperature warning system.

As may be seen in FIGS. 2 and 3, a wheel-end assembly 2 (which may also be referred to herein as a wheel end) may be mounted to a spindle section 10 of an axle 12 and comprise a hub 4, bearings 6 on which the hub may rotate around an axle, a brake drum 8, a wheel (not shown) and a tire (not shown). The spindle 10 may be unsealed, or may be sealed at the time of manufacture, or may accept a plug 9 to seal the spindle. Plug 9 may, for example, be a press plug which may sealingly engage the inside of the axle 12 or spindle section 10 thereof and may be held in place by an interference fit without requiring additional mechanical means for locking the plug 9 in place. The plug 9 may provide a pressure barrier to contain the pneumatic pressure within the axle and may engage and support a stator of a rotary air connection, such as may be used in an automatic tire inflation system. Such an example of a rotary connection is described in more in connection with FIG. 15. Alternatively, a wheel-end assembly may include a plug 9 that does not seal the axle 12. In this disclosure, a plug 9 that is not required to seal an axle may also be referred to as a sensor mounting plate. In some embodiments, a plug 9 (or sensor mounting plate) may be positioned within a spindle section 10 of an axle 12 and made of a material suitable to ensure that a sensor head mounted to the sensor mounting plate is in a heat exchange relationship with one or both of the bearings 6. For example, a plug or mounting plate may be made of a carbon alloy steel or other suitable material and may be positioned approximate the bearings 6. If the bearings 6, brake drum 8, or other wheel end component fail, then such failure may cause a high temperature event such that a tire or the wheel end lubricant may catch fire. In some instances, bearings have been known to reach a high enough temperature that the bearings melt. A wheel end temperature monitoring system may allow an operator to identify the onset of such a situation before such a critical hazard level is achieved at the wheel end.

As may be seen in the embodiment of FIG. 3, a wheel end temperature monitoring system 1 may comprise a first electrical temperature sensor or temperature transducer 14 disposed at or near the wheel end 2 and a transmitter 16 disposed on the axle 12 so as to monitor local temperatures in the wheel end 2. In some embodiments, the wheel end temperature monitoring system 1 may also include a receiver 15 and a dedicated vehicle data collection system or computer 19 coupled thereto. The data collection system or computer 19 may be specifically programmed to process one or more temperature signals, initiate one or more alerts or alarms and/or display temperature data. A temperature signal may also be conditioned so that a transmitter 16 may send the temperature signal to an otherwise programmable computer of a vehicle data collection system or other data collection system, such as may be external to a vehicle.

In the embodiment shown in FIG. 3, the axle 12 may be sealed by a plug 9 so as to permit pressurization of the axle 12 for a tire inflation system. The temperature sensor 14 may be a thermocouple that is disposed in the plug 9 adjacent to the centerline of an outboard spindle face 18 so as to allow the rotary union 20 of a tire inflation system to be fitted at the centerline of the spindle face. Advantageously, temperature sensors such as thermocouples used herein may operate at relatively extreme temperatures and over an extended temperature range. For example, the sensors shown in FIGS. 4-6 may operate over a wide temperature range, such as a temperature range of about −40 degrees Celsius to about 1000 degrees Celsius.

Figure 4:
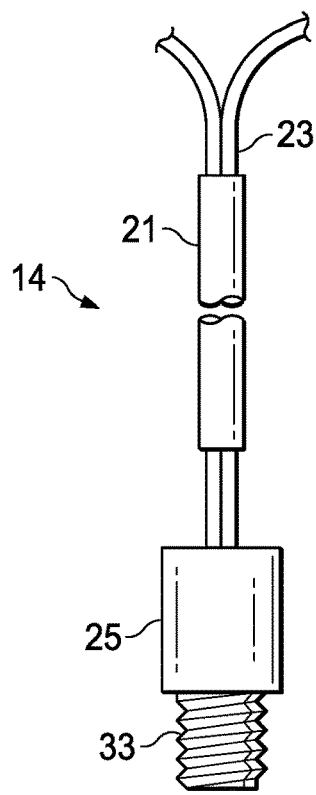
FIG. 4 illustrates a temperature sensor including a threaded temperature sensing head.
Figure 5:
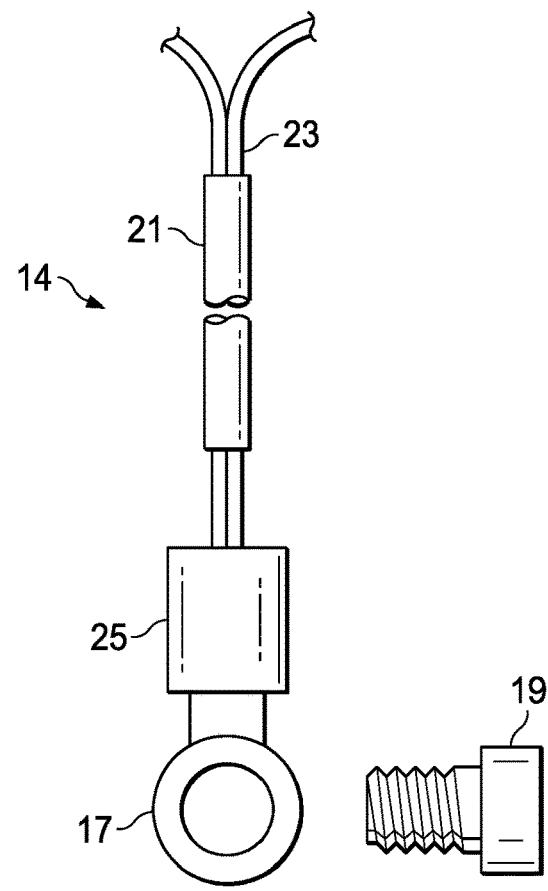
FIG. 5 illustrates a temperature sensor including an eyelet and screw useful for fixing the temperature sensor to a wheel end component of a vehicle.
Figure 6:
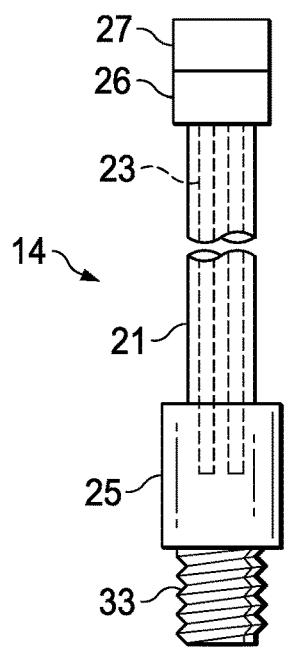
FIG. 6 illustrates another embodiment of a temperature sensor.

As shown in FIGS. 4-6, a temperature sensor 14 may be a thermocouple having a protective sheath 21 enclosing a pair of wires 23. The pair of wires 23 may terminate at a sensor head 25 of the sensor 14. The sensing head comprises dissimilar materials as is known in the thermocouple art. A thermo-electric current or voltage (which may be referred to as a thermo-electric signal) may be generated which depends on the composition of the two dissimilar materials and the temperature. The temperature sensor 14 may include also include a reference junction 26, such as may include one or more component sensors for measurement of a reference temperature. A voltmeter 27 may be integrally included in the temperature sensor 14 or circuitry for voltage measurement may be externally coupled to the temperature sensor 14.

As shown in each of FIG. 4 and FIG. 6, the sensor head 25 may include a threaded portion 33 to facilitate mounting of the sensor 14. For example, the sensor 14 may be attached to the spindle 10 or a plug or other wheel end component using a threaded portion 33 of the sensor head 25. The protective sheath 21 may insulate the pair of wires 23 and protect components of the sensor 14 from wear. For example, protective sheath 21 may be a highly durable and temperature resistant steel-braid to protect the pair of wires 23, which may otherwise be subject to considerable friction and wear, particularly when the sensor head 25 is mounted within the spindle section 10 of an axle 12 and wherein at least a portion of the wires 23 may be otherwise be subject to severe conditions during vehicle operation.

As shown in FIG. 3B, a temperature sensor 14 may include a sensor head 25 that is configured for mounting by use of a fastener. For example, the sensor head 25 may include a ring eyelet 17 configured for mounting the sensor 14. A socket head cap screw 19 or other suitable screw or fastener may be inserted through the opening of the ring eyelet 17 and used for mounting the sensor 14, such as to the spindle 10 (e.g., mounted to the spindle face 18) or to another wheel-end structure, such as a plug 9 (as also shown and in FIG. 3). Other wheel-end locations for mounting a sensor 14, such as may be used to position a sensing head or probe region of the sensor 14 on or near a component for temperature monitoring, may include the hub 4, hub lugs, brake system body 8, and a hubcap. For mounting to wheel end components that rotate with respect to the axle, a rotary electrical coupling may be used to connect the sensor head and transmitter by wired connection.

A temperature sensor 14 may monitor the local temperature of a component to which the sensor is attached. In some embodiments, a temperature sensor may contain more than one sensing head or probe. Thus, each of a plurality of sensing heads or probes may be inserted into an associated component for temperature monitoring. The temperature sensor may then monitor the internal temperature or adjacent temperature of more than one component or associated regions of a wheel end so as to provide a more accurate temperature profile of a desired region. For example, a difference in temperature between two or more components of a wheel end may provide for sensitive detection of a fault condition or otherwise serve other diagnostic functions, such as to indicate that one or more sensors or probes of a sensor may be damaged and need to be replaced.

The system 1 may include a transmitter 16 electrically coupled to the temperature sensor 14. Such coupling may be wired or wireless and may permit communication of a temperature signal from the temperature sensor to the transmitter 16. For example, a wired connection between the transmitter 16 and the temperature sensor 14 may be used when the transmitter 16 is attached to the axle 12, or other suitable locations. Where a wireless link is established between the transmitter 16 and temperature sensor 14, the transmitter may be located near but outside of a wheel-end assembly, such as on the axle or another suitable location of a vehicle frame. In some embodiments, a transmitter 16 may be integrally linked to the temperature sensor 14, such as included in a common housing together with other components of the temperature sensor 14. The transmitter 16 may be disposed on the axle 12 at a distance from the wheel-end assembly 2 such that heat generated therein does not pose a hazard to the electronics or housing of the transmitter 16, thus avoiding potential damage from high wheel-end temperatures, mechanical impact and lubricants. In some embodiments, the pair of wires 23 may be sized in length so as to enable positioning of the reference junction 26 at a suitable distance from the sensor head 25. For example, either or both of a reference junction 26 and voltage measurement circuitry (e.g., voltmeter 27) may be positioned at a distance from the wheel-end assembly 2, such as on axle 12. The transmitter 16 may be coupled to the axle 12 through a tapped hole in the axle or at or near the mid-point of a non-tapped bore into the axle.

While a threaded connection may be preferred for connecting the sensor 14 and transmitter 16 to the spindle and axle, other means of mechanically joining the components may be utilized. Welding, gluing, and strapping are some examples of possible coupling methods other than a threaded connection. For example, in some embodiments, a sensor head 25 may be attached to a wall of the spindle section 10 via a threaded connection and in some situations additionally glued or fixed therein so that a sensing junction of the head 25 is in intimate contact with the wall of the spindle section 10. Such a connection may help to ensure that the sensor head 25 and thermo-electric junction therein are in a heat exchange relationship with the bearings 6 or other component of the wheel-end assembly.

The transmitter 16 may be able to send collected signal data to a data acquisition module 19 of a wheel end high-temperature warning system. In some embodiments, the data acquisition module 19 may be part of another vehicle data collection and/or processing system, such as a processing module for a tire inflation system. By way of nonlimiting example, a data collection module 19 may be part of another data processing or collection system such as a tire pressure monitoring system, an anti-lock braking system (ABS), a telematics system, or other onboard or attached vehicle system. Likewise, the transmitter 16 may also be shared among two or more different data collection systems. In some embodiments, a transmitter 16 may include a processor, such as may include one or more memory buffers. The processor may, at least temporarily, store data from signals received from different vehicle systems and selectively send signals in a desired manner as may be needed for further processing. Such a processor may be programmed to direct transmission of temperature signal data at a predetermined rate or frequency. And, in some embodiments, that rate or frequency of transmission of temperature signal data may be adjusted based on characteristics of one or more input signals. For example, if a temperature signal is received from a temperature sensor 14, and the signal indicates that one or more wheel end components may be near a temperature limit, a rate of data transmission may be adjusted. To that aim, a processor included in the transmitter 16 may be capable of performing at least a rudimentary analysis of signals to compare the signals to one or more specification limits. Accordingly, if a wheel-end assembly is within acceptable boundaries (e.g., within normal specification limits for vehicle operation) temperature data may be transmitted to the data acquisition module 19 at a low rate. If signal changes to indicate that the temperature of a wheel-end assembly may be closer to an alarm threshold, a rate of data transmission may be increased.

In some embodiments, either or both of receiver 15 and/or transmitter 16 may be configured for two-way communication. For example, receiver 15 may be readily accessed by the data acquisition module 19, which may include a more sophisticated processor for analysis of temperature data. Data acquisition module 19 may be configured to send a signal using receiver 15 (if appropriately configured for two-way communication) to instruct appropriately configured transmitter 16 to increase or decrease a rate of signal transmission. Thus, signal data may be selectively transmitted when one or more fault conditions may be most likely. Accordingly, energy used in transmission of signal data may be conserved.

In some embodiments, the transmitter 16 may have an internal power supply. Such a power supply may be a battery, dynamo, or other energy storage or energy producing device. The transmitter may communicate with the data collection system through a wireless protocol and methodology. Alternately, the transmitter may be powered by a separate power source through a wired connection. For example, the transmitter 16 may be connected to the vehicle main electrical system or other vehicle sub-system to power the transmitter. Such sub-system may include but not be limited to an ABS, tire pressure monitoring system (TPMS), or other powered subsystem.

Figure 7:
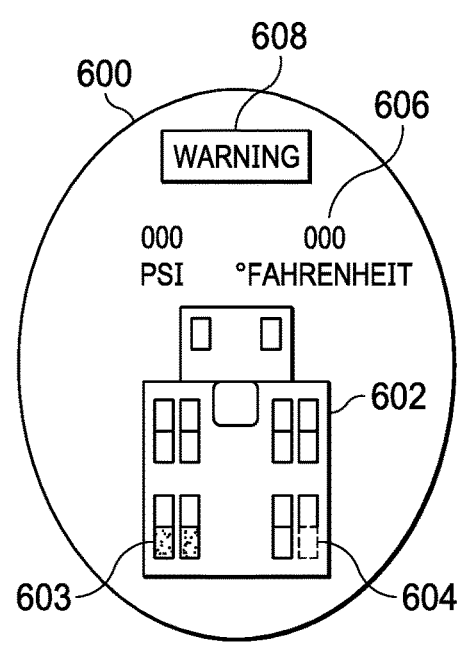
FIG. 7 illustrates an example of a visual display for pressure and temperature data.
Figure 8:
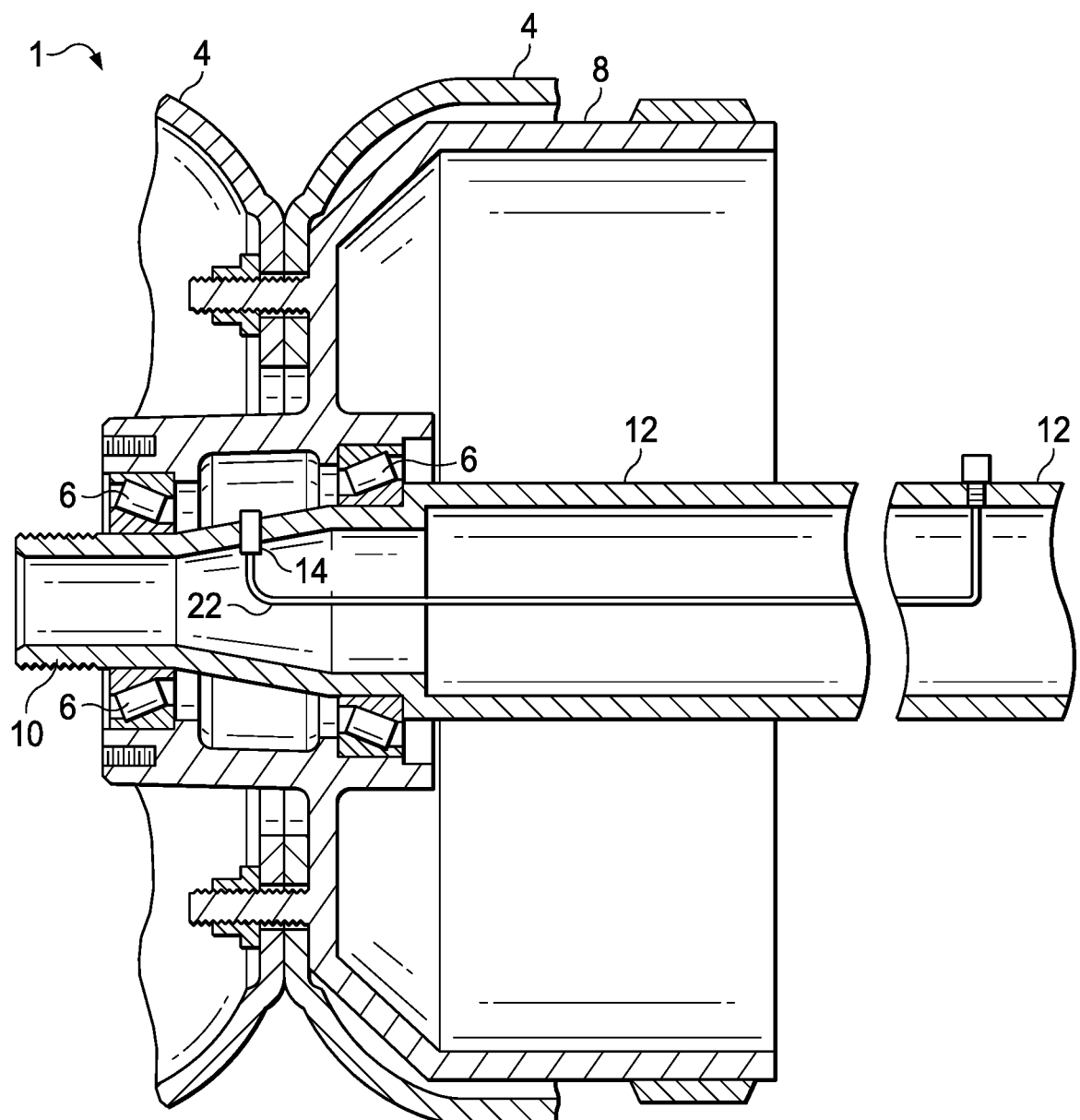
FIG. 8 illustrates an embodiment of a fixed axle wheel end with a temperature sensor installed in the axle between the two wheel bearings.

An example of such a transmitter 16 may be a sensor-transmitter package from a TPMS that is adapted to collect the thermal data from the wheel end temperature sensor 14. The adaptation may include the TPMS sensor package being reconfigured to accept temperature data rather than pressure data or the TPMS transmitter package may be reconfigured to accept both temperature and pressure data. Such a temperature adapted TPMS sensor may collect the temperature data and display the data, transmit the data to another module, or both display and transmit the data. FIG. 7 illustrates one embodiment of a view of the data display 600 of a TPMS sensor package, such as those carried by Truck System Technologies, adapted to collect and display both pressure and temperature data. The displayed data may be related to the particular wheel end and associated tire to which the sensor is mounted. For example, as shown in FIG. 7, a display 600 may include a diagram or schematic view 602 of a trailer. An individual tire or wheel end 604 may be emboldened or highlighted in some way, such as using dashed or broken lines or another suitable indicator. A displayed temperature 606 may be shown for the selected tire or wheel end 604. A toggle or selector button may be used to switch between tires or wheel ends. A display system may be configured to display the measured temperature 606 and further provide an indication of whether the temperature is within a certain range (e.g., within a specification or normal range) or both. For example, to indicate that a wheel-end assembly is within a certain range digital temperature data may be color coded or another indicator of a temperature range may be provided. A display may further provide a display 608 providing an indication of any active alarms or warnings. Tires or wheel ends 603 may be color coded or otherwise designated to identify one or more tires or wheel ends for which an alarm applies.

The temperature sensor 14 and transmitter 16 may be in communication with one another by means of a wired connection 22. For example, wired connection 22 may comprise the pair of wires 23 or another connection may be used. For example, as described above, the wired connection 22 may comprise a pair of wires 23 protected by a suitable protective sheathe 21 and routed through the interior of the spindle 10 and to axle 12. The protective sheath may, for example, be a steel-braided protective sheath.

In a further embodiment, as shown in FIG. 4, the temperature monitoring system 1 may comprise a first temperature sensor 14 disposed through the wall of the spindle section 10 and a transmitter disposed on an axle 12, such as through the wall of the axle 12. Such a configuration may be utilized in wheel ends containing an unsealed or sealed spindle and axle. The temperature sensor 14 may be disposed at the spindle 10 in such that the sensor 14 is located at the interior of the hub 4. The transmitter 16 may be disposed on the axle 12 such that the transmitter is substantially isolated from elevated temperatures resulting of the wheel end 2.

In other embodiments, multiple temperature sensors may be coupled to a single transmitter. The transmitter may be configured to discriminate among multiple temperature sensor signals. Thus, if one of the multiple temperature sensors detects a high local temperature, the transmitter may transmit just the signal from that temperature sensor. In other embodiments, the transmitter may send signals from all of the multiple temperature sensors, and the receiving system may determine which temperature sensor has provided the high temperature signal. More than one temperature sensor may be placed in a wheel-end assembly. In some embodiments, a temperature fault may further be initiated based on a threshold difference in temperature between two or more sensors, a threshold rate of change of temperature for one or more sensor, or both.

Although not limited to use with fixed axles, the previous embodiments focused on a temperature monitoring system for a fixed axle. However, systems herein may generally be applied to either of a fixed or a steer axle, as described in the following embodiments described in relation to FIGS. 9-18.

Figure 9:
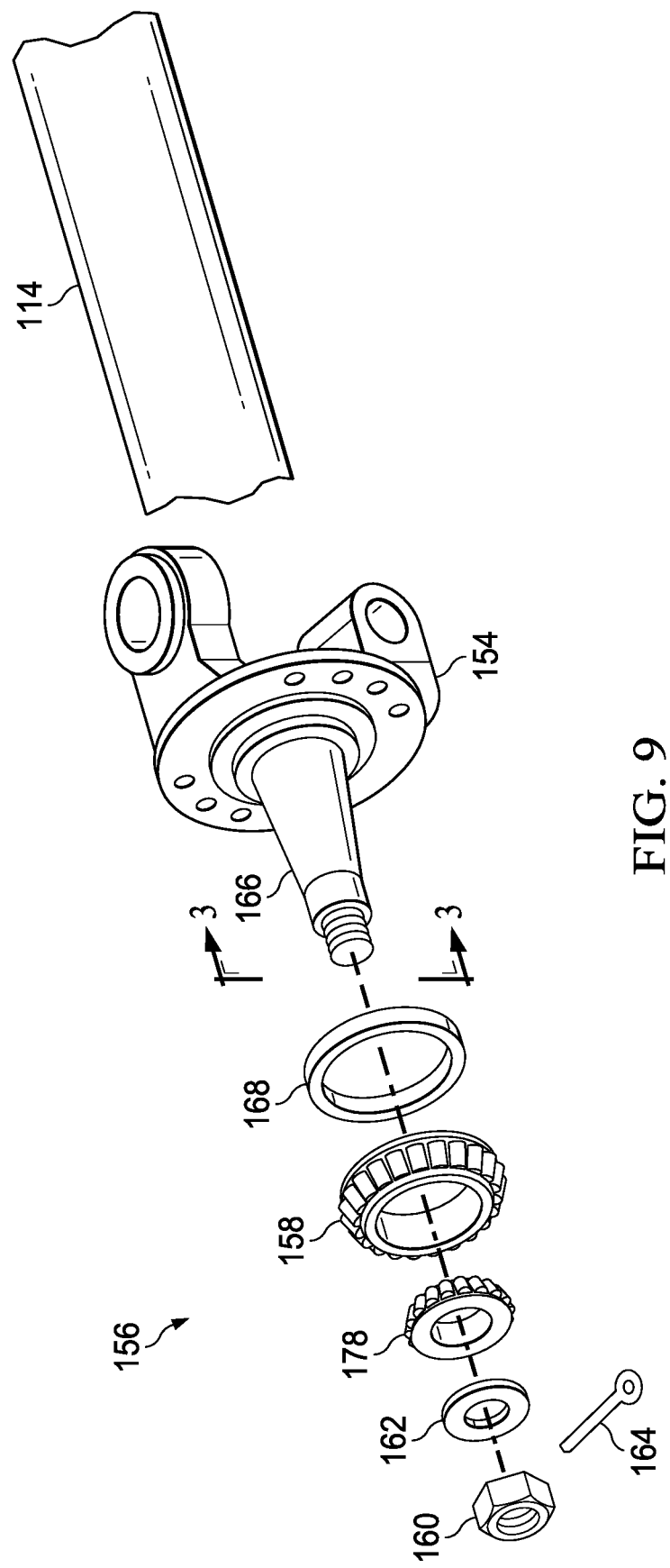
FIG. 9 illustrates an axle and wheel end.

Referring to FIG. 9, a steer axle 114 may be comprised of a wheel spindle 154 on which the wheel end assembly 156 may be mounted. The wheel end assembly 156 may include a hub (not shown) which may rotate on inner bearings 158 and outer bearings 178. A wheel 108, tire 110 (as shown in FIG. 1), and hubcap may be mounted to the hub. A brake drum (not shown) may be integrally formed with the hub or otherwise mounted to the hub. A wheel end assembly 156 may contain other components, parts, or attachments that are not shown yet still monitored by the temperature monitoring system.

The outer bearings 178 may be retained by a spindle nut 160. A washer 162 may be mounted may between the spindle nut 160 and outer bearing 178. A cotter pin may be inserted through a receiving hole in the end of the wheel spindle so as to prevent the spindle nut 160 from becoming unscrewed. The spindle 154 may be pivotably mounted to the steer axle 114 via a knuckle post assembly (not shown). A hub cap (not shown) may be mounted to the hub so as to generally seal the bearings 158 and 178 from debris and prevent the loss of lubricant.

Figure 10:
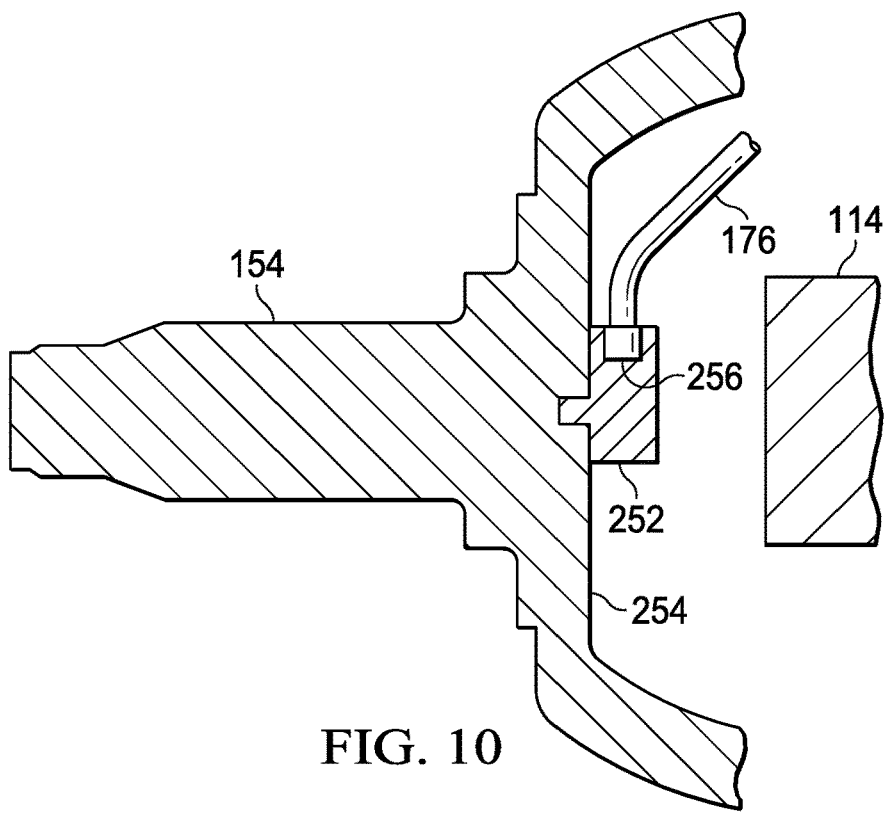
FIG. 10 illustrates an axle wheel end with an alternate sensor configuration.

As shown in FIG. 10, in one embodiment of a steer axle temperature monitoring system, a mounting block 252 may be disposed at the inboard or interior face 254 of the spindle 154. A temperature sensor 256, such as a thermocouple, may be then be mounted at the block 252. For example, a temperature sensor 256 or sensing head of a sensor may be threaded and mate to a threaded hole in the block 252. Alternately, the sensor 256 may be welded, glued, epoxied, bolted, or otherwise mechanically mated to the block 252. In one example, the block 252 may be positioned, sized, constructed, and/or bonded to the interior face 254 of the spindle to facilitate heat exchange between the block 252 and the bearings 158. For example, the mounting block 252 may be made of a material such as steel or brass.

Figure 11:
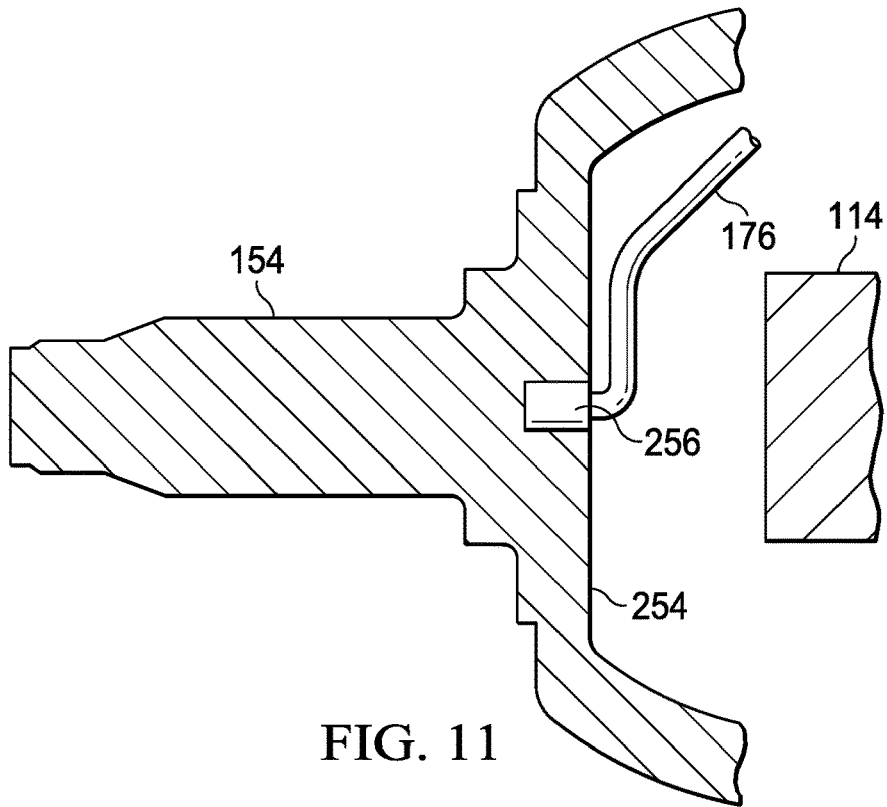
FIG. 11 illustrates an axle wheel end with another alternate sensor configuration.

In some embodiments, a temperature sensor 256 may be directly disposed at the interior face 254 of the spindle 154 such as in FIG. 11. The sensor may be adhesively bonded to the face or may be threaded into a port that has been tapped into the spindle 154. In some embodiments, the sensor 256 may maintain a probe into the body of the spindle. While the centerline of the inner face 254 may be an ideal location for disposition of the sensor 256 when avoiding routing a wire through the body of the spindle, any location on any exterior face of the spindle may be suitable as allowed by differing wheel end and spindle designs and configurations. With any such exteriorly mounted sensor 256, the wire 176 may be routed through the spindle to the axle through a channel cross-drilled in the spindle 154, such as may be seen in FIG. 12. In other embodiments, a temperature sensor 256 may be disposed at the outboard end of the spindle 154 as in FIG. 13 or through the mid-body wall of the spindle 154 as in FIG. 14. More than one temperature sensor may be placed in a wheel-end assembly.

The disposition of the temperature sensor 256 may allow for the collection of direct thermal data pertaining to the spindle 154 and indirect thermal data for adjacent wheel end components. A temperature sensor 256 may be in wired communication with a transmitter (not shown) disposed on the axle as in previous embodiments. A wire 176 may be routed from the sensor to the transmitter through or around the knuckle post assembly and then the axle or other suitable routing path. In other embodiments, a sensor 256 may be in wireless communication with a transmitter or a data collection module elsewhere on the vehicle.

Figure 15:
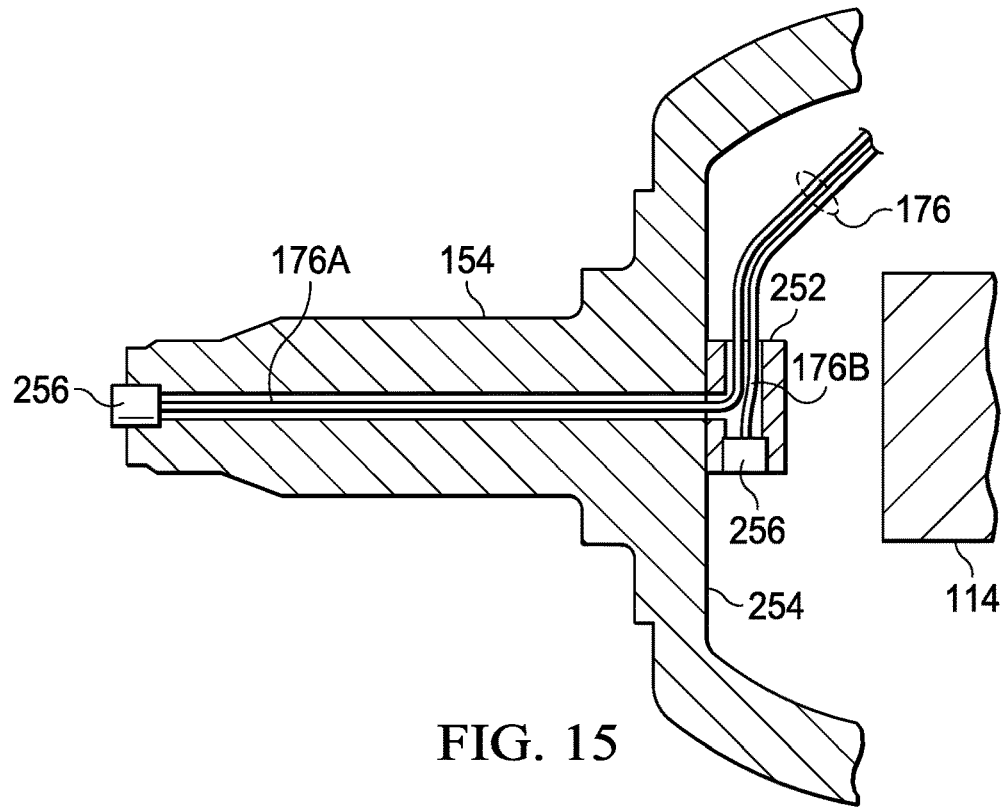
FIG. 15 illustrates a steer axle wheel end with a sensor at the inboard face and the outboard face.

In some embodiments, a steer axle temperature monitoring system may have a plurality of temperature sensors disposed at the spindle as seen in FIG. 15. A first sensor 256 may be disposed at or through the outboard end of the spindle 154 while a second sensor 256 is disposed at a mounting block 252 on the inboard face 254 of the spindle 154. The sensors may be in electronical communication with a transmitter (not shown in FIG. 15) to communicate collected temperature signal data to a vehicular data acquisition module. As described previously, the vehicular data acquisition module may also collect and process data associated with one or more additional system such as an automatic tire inflation system or anti-lock brakes system. In some embodiments, a wire 176 (which, as shown therein may comprise two or more component wires 176A, 176B) may maintain electronic communication between the first and second sensor 256 wherein the wire is disposed through the interior of the spindle body 154. Alternatively, a separate wire may be used to connect each of the first and second sensors to other components of a high temperature warning system. Alternately, the first and second sensor 256 may be in wireless communication with one another and a vehicular data acquisition system.

The transmitter may be configured to send a high-temperature alert to a driver mobile device or fleet operator computer or other recipient by text message or email when the temperature sensor detects a temperature above a temperature threshold. The temperature threshold may be a temperature past which the wheel end might risk fire or melting of components, such as bearing seals. In other embodiments, a high-temperature warning system may receive temperature data from the transmitter, and may send such an alert to a driver or fleet operator. The high-temperature warning system may be configurable to provide more than one temperature threshold, depending on how many and where sensors are used for a wheel-end. In yet other embodiments, the transmitter may trigger an in-cab alert (such as a sound, light, or message) if a dangerously high temperature is detected. The transmitter may be in communication with other components of a high-temperature warning system through wired or wireless connection. Any suitable wireless network may be used to send an alert. In some embodiments, the transmitter may be a client device in a client-server network architecture, or may send temperature data to a client and/or server where such a network architecture is used for a high-temperature warning system.

In some embodiments, the transmitter may be configurable to recognize and adopt communication with one or more transducers, and to receive adjustable temperature warning threshold settings for each transducer. Each transducer may be individually coded to permit a high-temperature warning system to identify and depict on a graphical user interface the vehicle location and temperature reading of each transducer.

Figure 16:
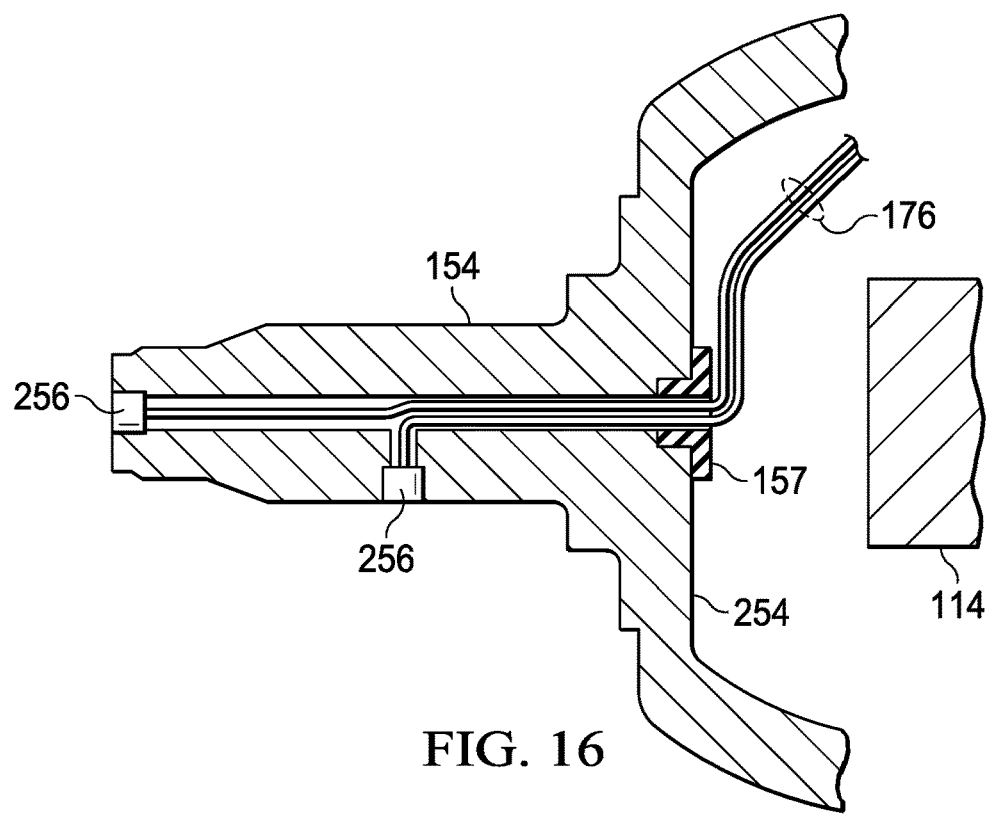
FIG. 16 illustrates a steer axle wheel end with a sensor at the spindle mid-body and the outboard face.

In further embodiments, a steer axle temperature monitoring system may have a plurality of temperature sensors disposed in the spindle as seen in FIG. 16. A first sensor 256 may be disposed at or through the outboard end of the spindle 154 while a second sensor 256B is disposed through the mid-body wall of the spindle 154. The sensors may be in electronic communication with a transmitter (not shown) to communicate collected data to vehicular data acquisition systems, such as an automatic tire inflation system or anti-lock brakes. A wire 176 may maintain electronic communication between the first and second sensor wherein the wire is disposed through the interior of the spindle body 154. A strain relief sleeve or wire grommet 157 may also be provided to help protect the wire 176 from wear. The wire may also be connected to a vehicular data collection system. Alternately, the first and second sensors may be in wireless communication with one another and a vehicular data acquisition system.

Figure 17:
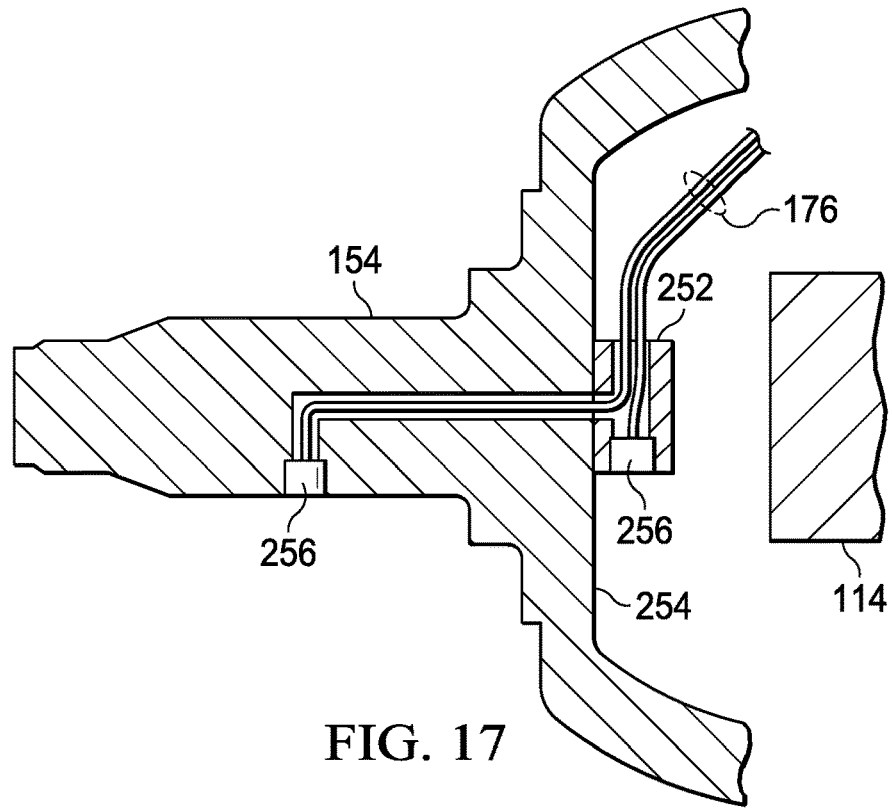
FIG. 17 illustrates a steer axle wheel end with a sensor at the spindle mid-body and the inboard face.

In yet another embodiment, a steer axle temperature monitoring system may have a plurality of temperature sensors disposed at the spindle as seen in FIG. 17. A first sensor 256 may be disposed through the mid-body wall of the spindle 154 while a second sensor 256 is disposed at a mounting block 252 on the inboard face 254 of the spindle. The sensors may be in electronic communication with a transmitter (not shown) to communicate collected data with data acquisition systems, such as an automatic tire inflation system or anti-lock brakes. A wire 176 may maintain electronic communication between the first and second sensors wherein the wire is disposed through the interior of the spindle body 154. The wire may also be connected to a vehicular data collection system. Alternately, the first and second sensor may be in wireless communication with one another and a vehicular data acquisition system.

Use of multiple sensors may permit calculation of a temperature gradient between sensors, and allow detection of the location and spread of high temperatures throughout the wheel end assembly.

Figure 12:
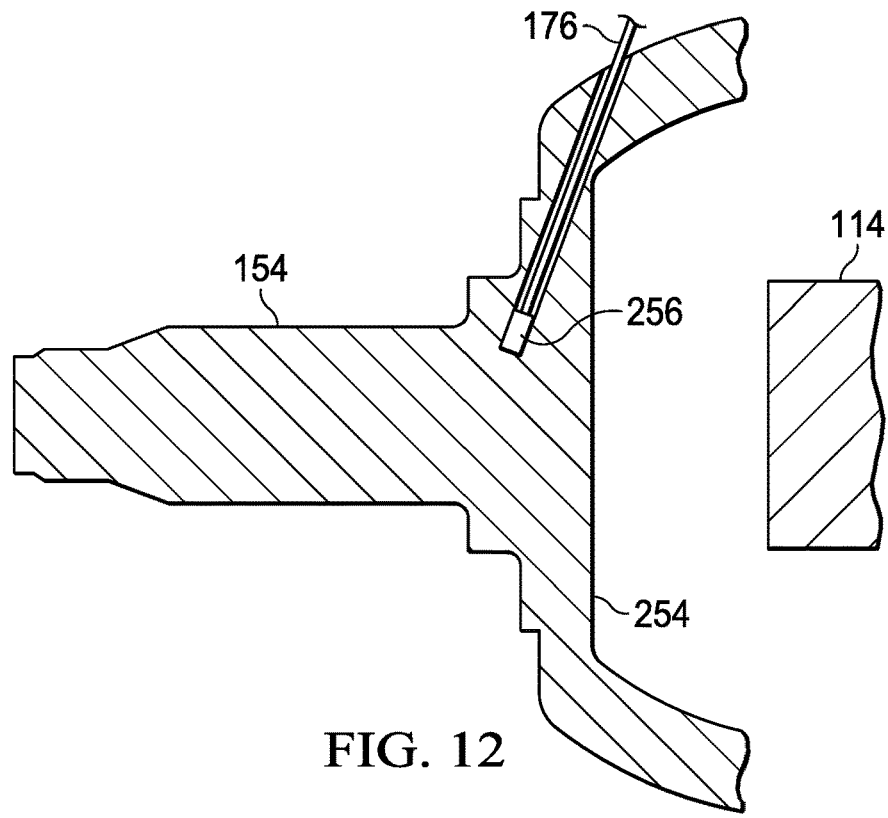
FIG. 12 illustrates the components of one embodiment of a steer axle wheel end.
Figure 13:
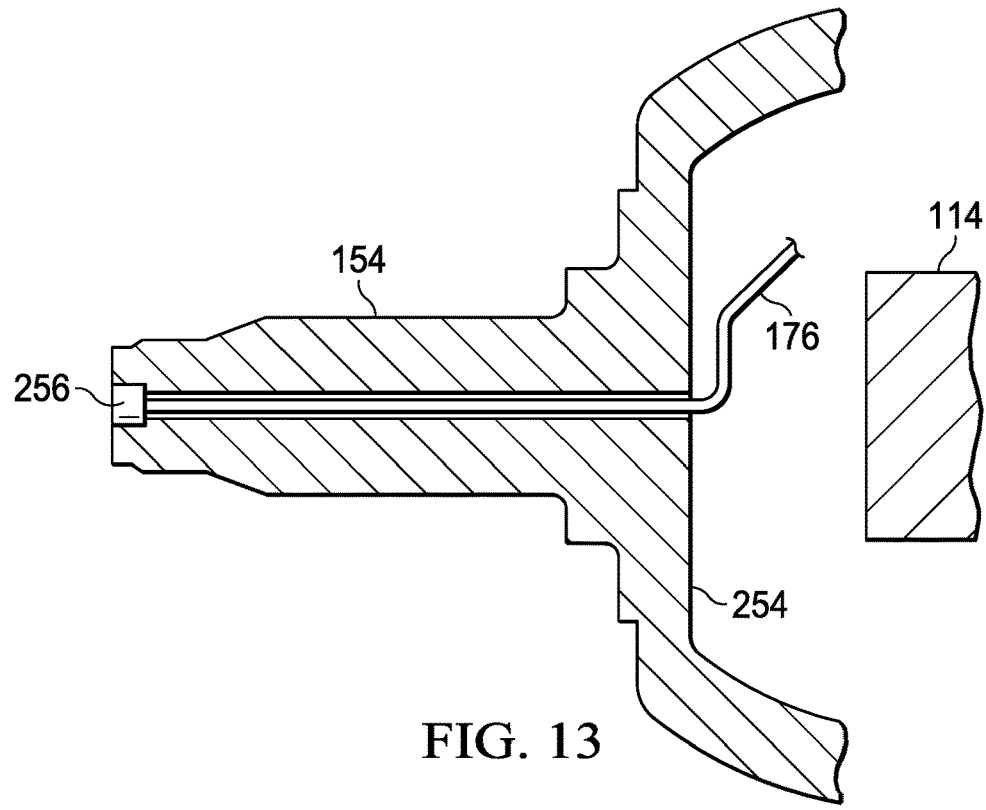
FIG. 13 illustrates a steer axle wheel end with a sensor at the outboard face.
Figure 14:
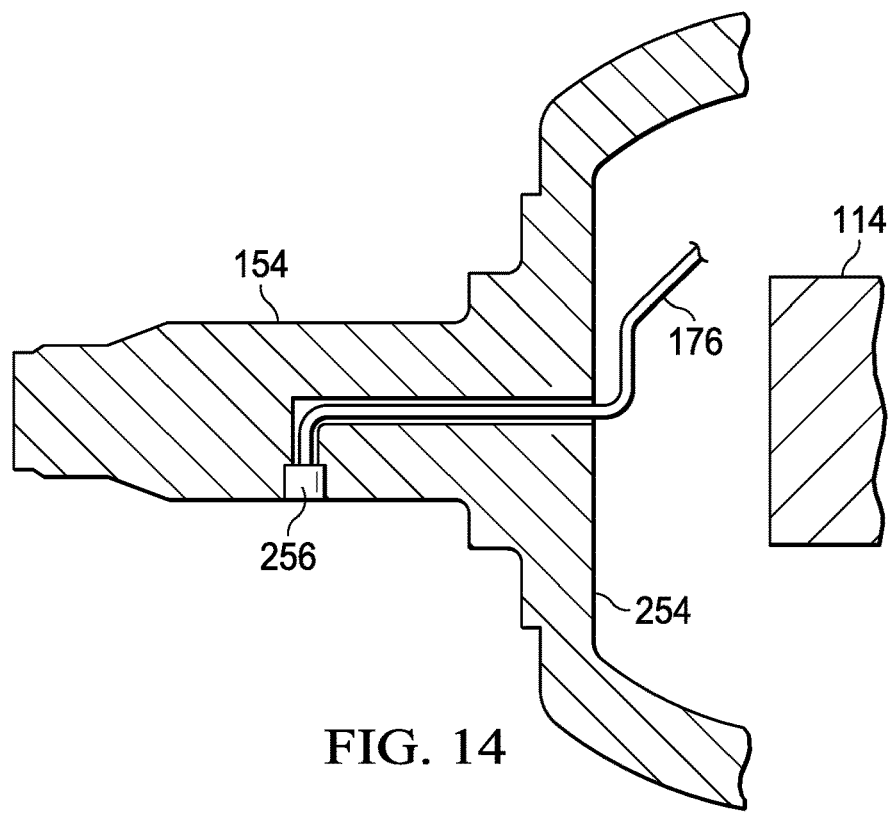
FIG. 14 illustrates a steer axle wheel end with a sensor at the spindle mid-body.

For embodiments wherein the wire is routed internally through the spindle, the wire may exit the body of the spindle at any point and then access a transmitter on the axle by means of cross-drilling the spindle as in the embodiment of FIG. 12.

Figure 18:
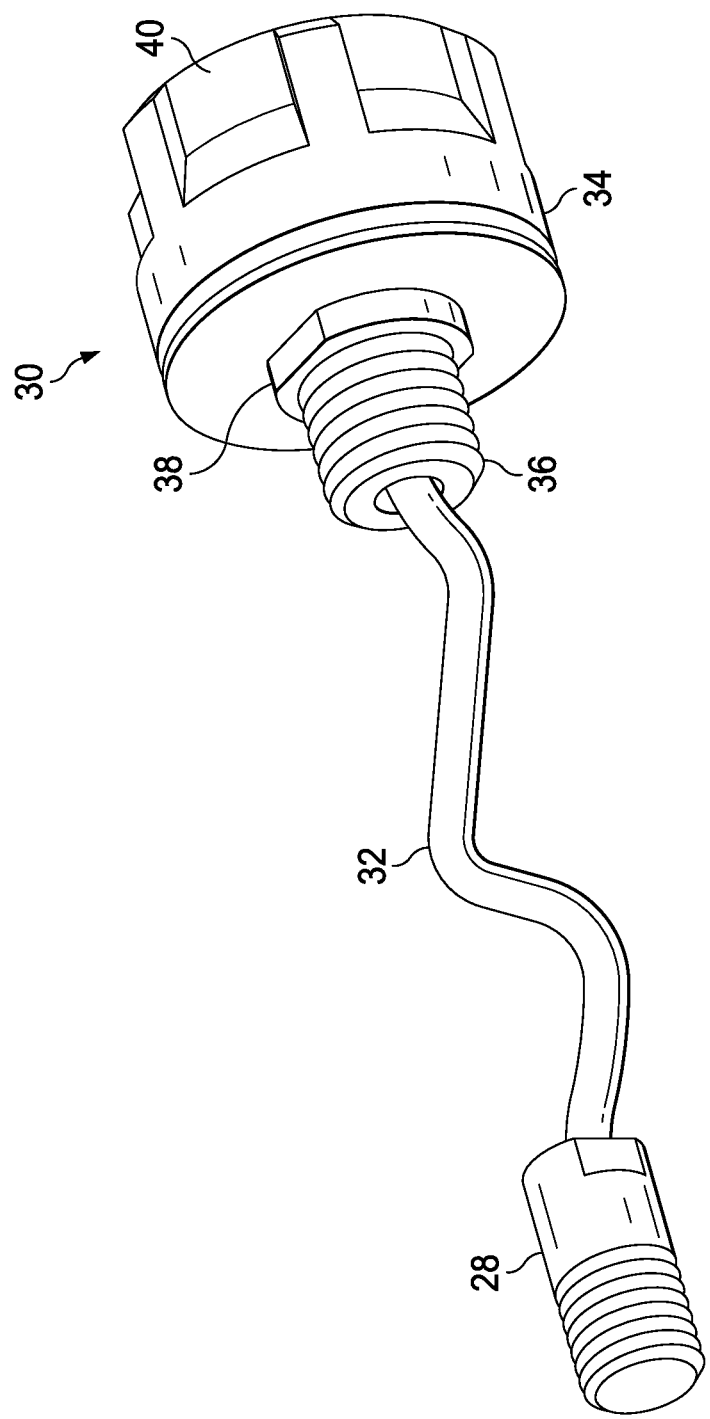
FIG. 18 illustrates an embodiment of a sensor and transmitter.
Figure 19:
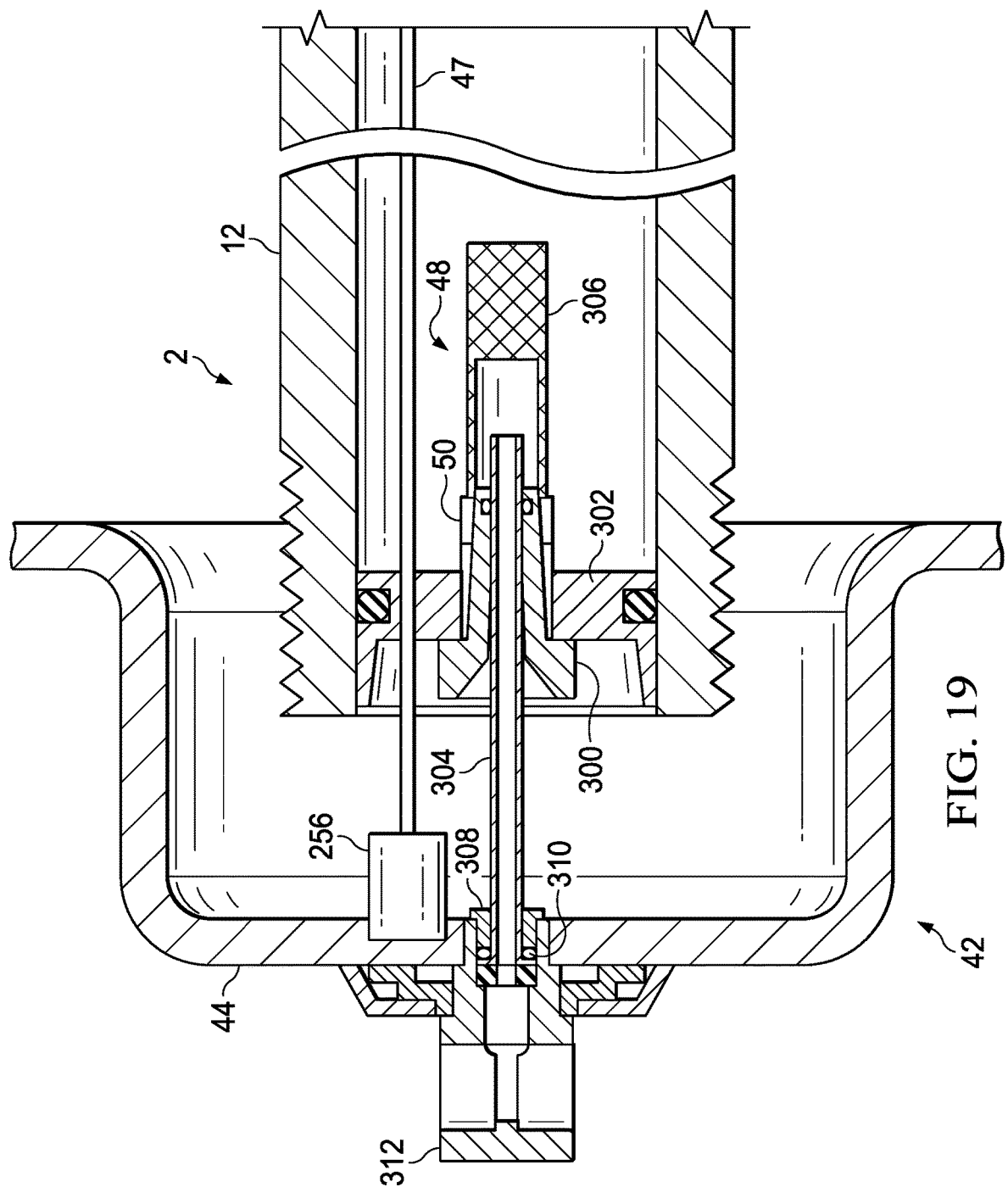
FIG. 19 illustrates an embodiment of a hub cap mounted sensor.

In some embodiments, as seen in FIG. 18, there may be a temperature sensor head 28 with a transmitter assembly 30 housed separately yet in communication with one another. The sensor head 28 and transmitter 30 may be electrically linked by means of a wire 32 wherein the wire is disposed through the interior of an axle. The sensor head 28 may couple to the outboard end of a sealed spindle or a plug in the spindle, for example, as the case may be for a particular spindle design. The sensor head 28 may be disposed adjacent to a rotary union in such cases that a rotary union is present in a wheel end. The sensor head 28 may be on the exterior or interior face of the spindle such that the sensor resides at the exterior of the spindle or interior space of the spindle respectively.

The transmitter 30 may couple to an axle and be so disposed as prevent interference with other wheel end components. For example, the transmitter 30 may be located about 30 inches from the temperature sensor 28. In some embodiments, the transmitter 30 may be located about 25 inches to about 40 inches from the transmitter or at the axe endpoint, approximately. Such a location may avoid interference with other vehicle components and provide a location sufficiently free from electronical or other interference for wireless communication between the transmitter 30 and any data collection systems of the vehicle. Alternately, the transmitter 30 may accept a wired connection to vehicle data collection systems. Such a wired connection may be realized through the use of a Deutsch connector (or other connector switchable for automotive use) at the transmitter to provide environmental protection for the wired connection point. Or, the sensor 28 may be connected to a vehicle data collection system using a suitably weather tight connector.

The transmitter assembly 30 may be an electronic device housed inside a protective body 34 with the body maintaining a mating lug 36 at the lower face of the body. Such a lug 36 may have a central passage through the lug so as to allow a wire 32 to pass from the electronic portion of the transmitter 30 for connection to the associated sensor head 28. The lug may also have a faceted portion or washer 38 integrated into the lug 36 at the upper portion of the lug, such as where the lug 36 joins the protective body 34 of the transmitter assembly 30. Such a washer 38 may provide an appropriate section of the overall transmitter assembly 30 at which torque may be applied via a tool such as a wrench. Additionally, the protective body 34 of the transmitter 30 may maintain a circumferential pattern of indentations 40. Such indentations 40 may allow a user to readily and adequately apply torque to the transmitter assembly 30 without the use of a tool. As in other embodiments, the transmitter assembly 30 may house a second temperature sensor or be adapted for use with a plurality of sensor heads.

Both sensor head 28 and transmitter assembly 30 may be coupled to their respective section of the vehicle by means of a threaded connection. For example, the sensor may be a thermocouple that threads into a port on a plug or spindle face, as the case may be, while the transmitter body maintains a threaded lug that mates to a port in the axle. Additionally, both sensor head 28 and transmitter assembly 30 may be sealed so as to provide environmental protection for the electronic electrically sensitive components or elements of each.

Figure 20:
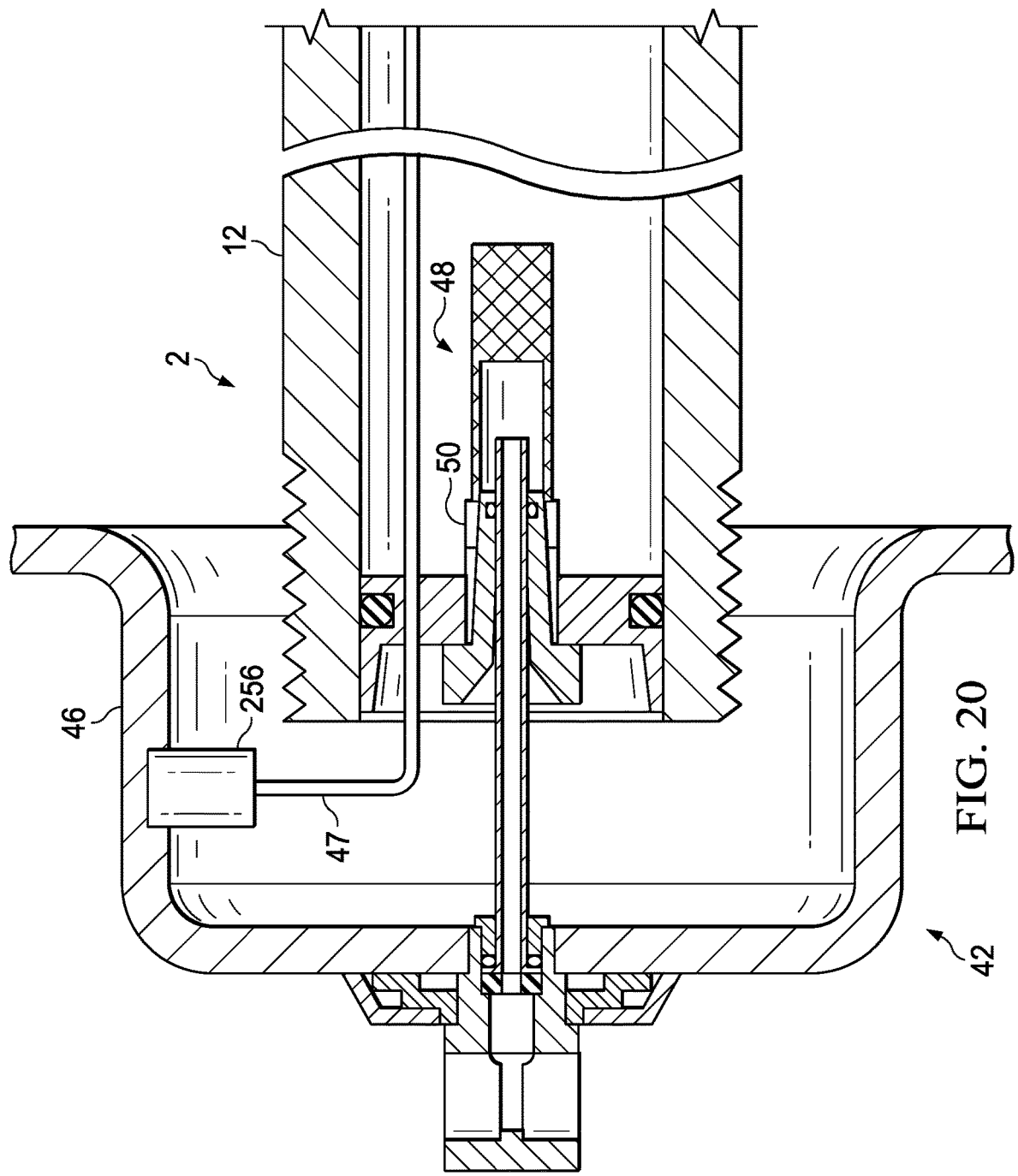
FIG. 20 illustrates an embodiment of a hub cap mounted sensor.

In another embodiment, the temperature sensor 256 may be disposed inside of a hubcap 42. The sensor may be located at the interior face of the hubcap of the outboard wall 44 of the hubcap as in FIG. 19 or at the interior face of the side wall 46 of the hubcap as in FIG. 20. The sensor 256 may be threaded into the wall of the hubcap or may be surface mounted to the wall. A wire 47 may be routed through the interior of the hubcap and through the wheel end 2 and further through the axle 12 to a transmitter (not shown) disposed further down the length of the axle. A rotary electrical connection (not shown), such as a slip ring, may be used to provide an electrical path from a rotating part to a stationary part of the wheel end. The temperature sensor may be utilized in a hubcap and wheel end containing a tire inflation system 48. Such co-usage of the two systems may be realized by routing the wire 47 adjacent to a rotary union 50 of the inflation system. Other components shown in FIG. 19 include a stator 300, which may be threaded into the plug 302, tubular member 304, filter 306, a telescoping cap 308, annular seal 310 (such as may comprise an O-ring), and tee body 312.

Figure 21:
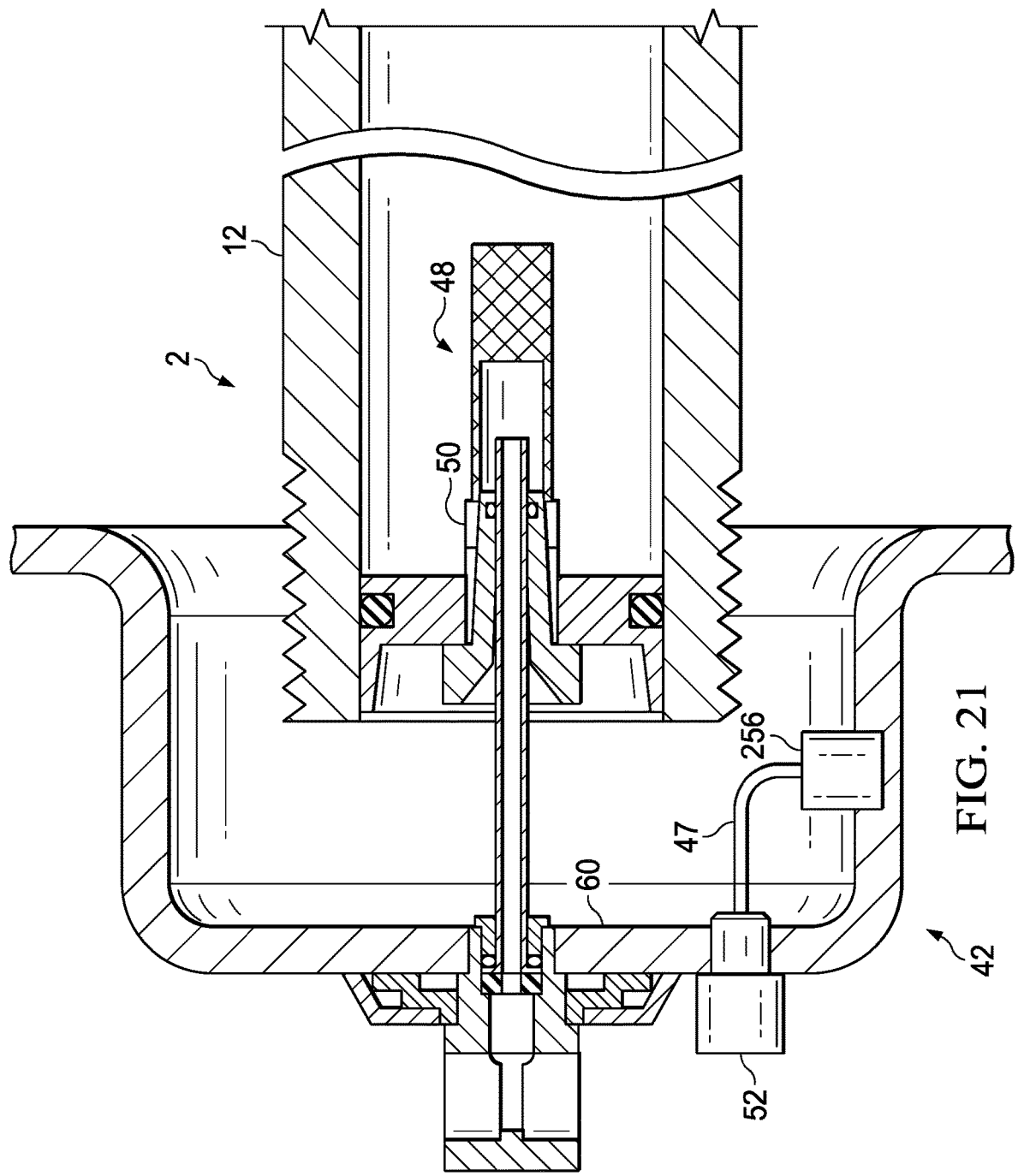
FIG. 21 illustrates another embodiment of a hub cap mounted sensor and transmitter.
Figure 22:
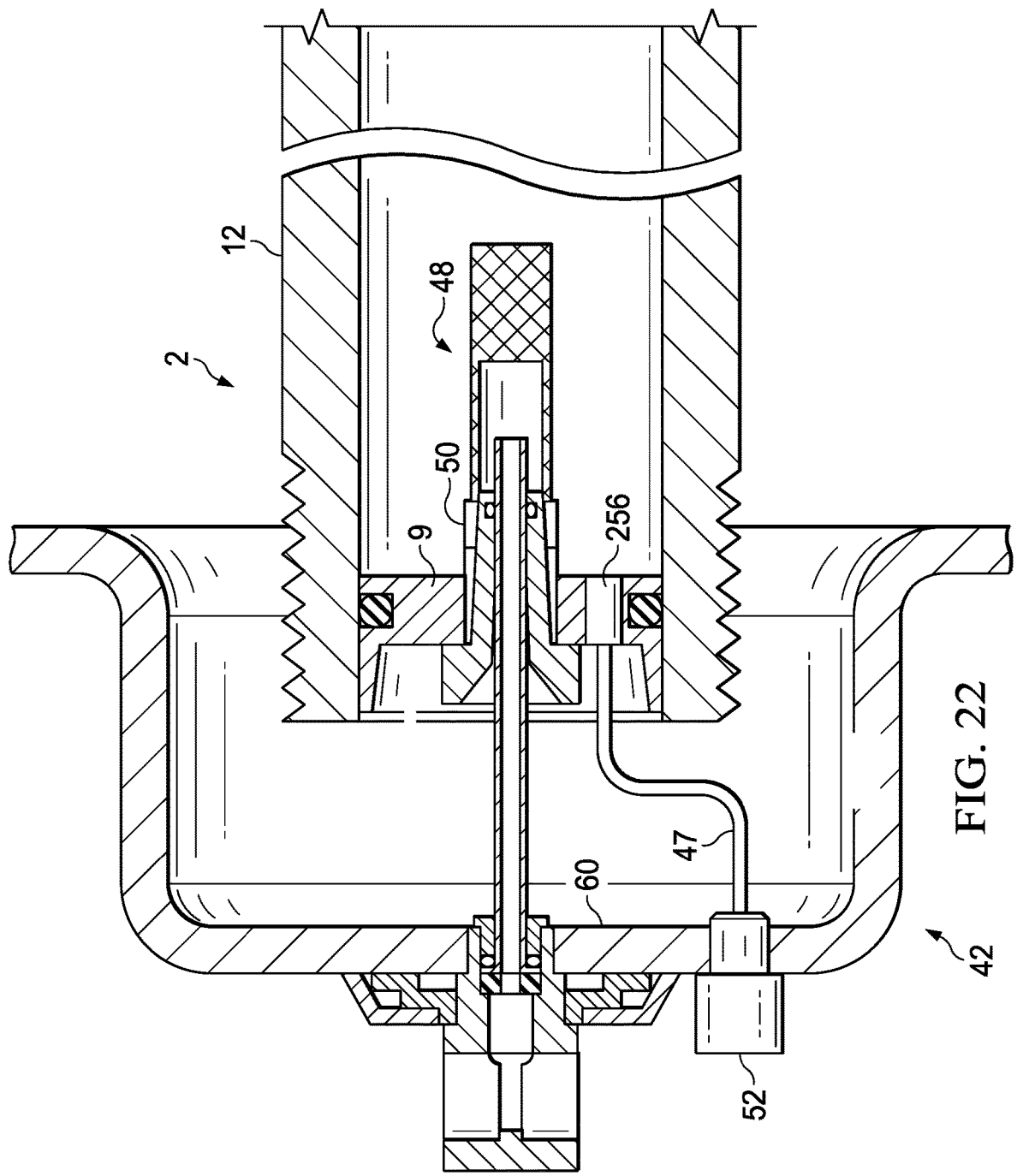
FIG. 22 illustrates an embodiment of a sensor mounted in a plug and a transmitter in a hubcap.

In yet another embodiment, as seen in FIGS. 21 and 22, a temperature sensor 256 may be mounted to a hubcap 42 with an associated transmitter 52 also mounted at the hubcap. The sensor 256 may be disposed at the interior face of the hubcap 42 while the transmitter 52 is disposed at the exterior face of the hubcap. In such an embodiment, the transmitter and sensor components may be of a unitary design or the transmitter and sensor may be separate components in electrical communication by means of an interconnecting wire.

As seen in FIG. 21, a temperature sensor and a transmitter may be separate components linked by a wire. The temperature sensor may be disposed at the interior face 60 of a hubcap in the vicinity adjacent to the wheel end so as to capture as accurate useful data. The sensor may be threaded into the wall of the hubcap or otherwise mechanically attached to the hubcap. A wire 47 may link the sensor to a transmitter 52 so as to maintain electrical communication between the components.

As seen in FIG. 22, a sensor head 256 of a temperature sensor may be mounted in a plug 9. A wire 47 may link the sensor to a transmitter 52 so as to maintain electrical communication between the components.

Figure 23:
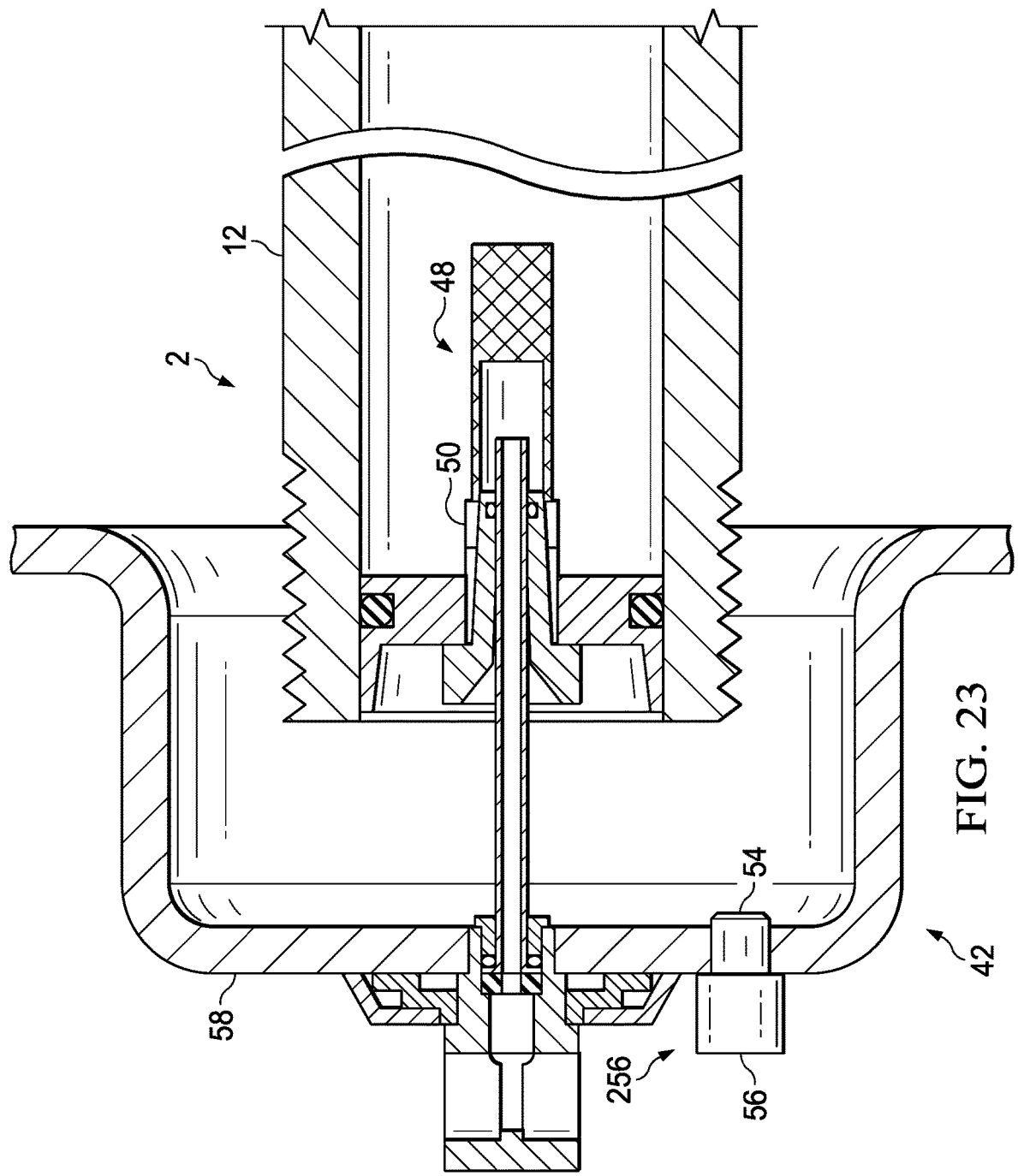
FIG. 23 illustrates yet another embodiment of a hub cap mounted sensor with an integrated transmitter.

A unitary design is illustrated in FIG. 23. In such a configuration, a threaded body 54 of the temperature sensor 256 may be directly attached to a housing 56 in which are disposed the electronic components of the transmitter component. A visual display may also be incorporated into the housing to visually communicate the temperature data. As in previous embodiments, the transmitter 52 may collect and disseminate temperature data solely or may also collect and disseminate tire pressure data in conjunction with wheel end temperature data. An embodiment that collects both temperature and pressure data may reflect a temperature sensor combined with a TPMS sensor as previously described.

Figure 24:
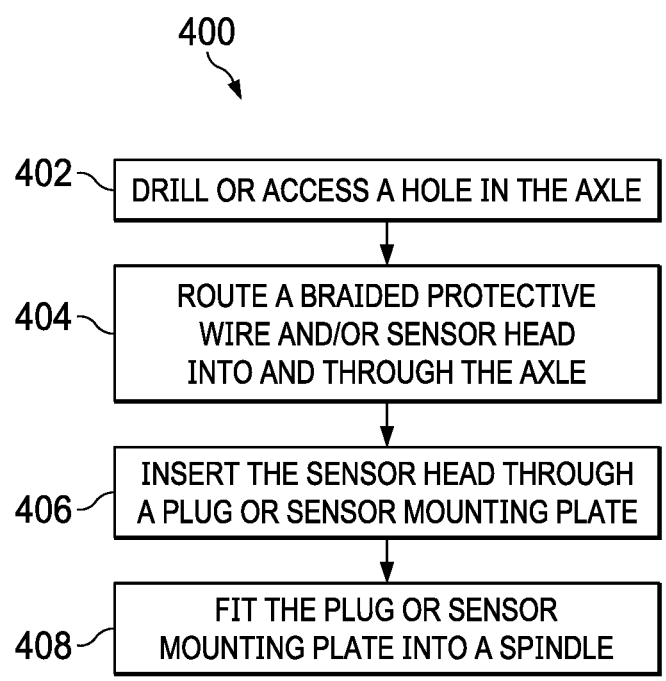
FIG. 24 illustrates an embodiment of a method for installing a high-temperature warning system.
Figure 25:
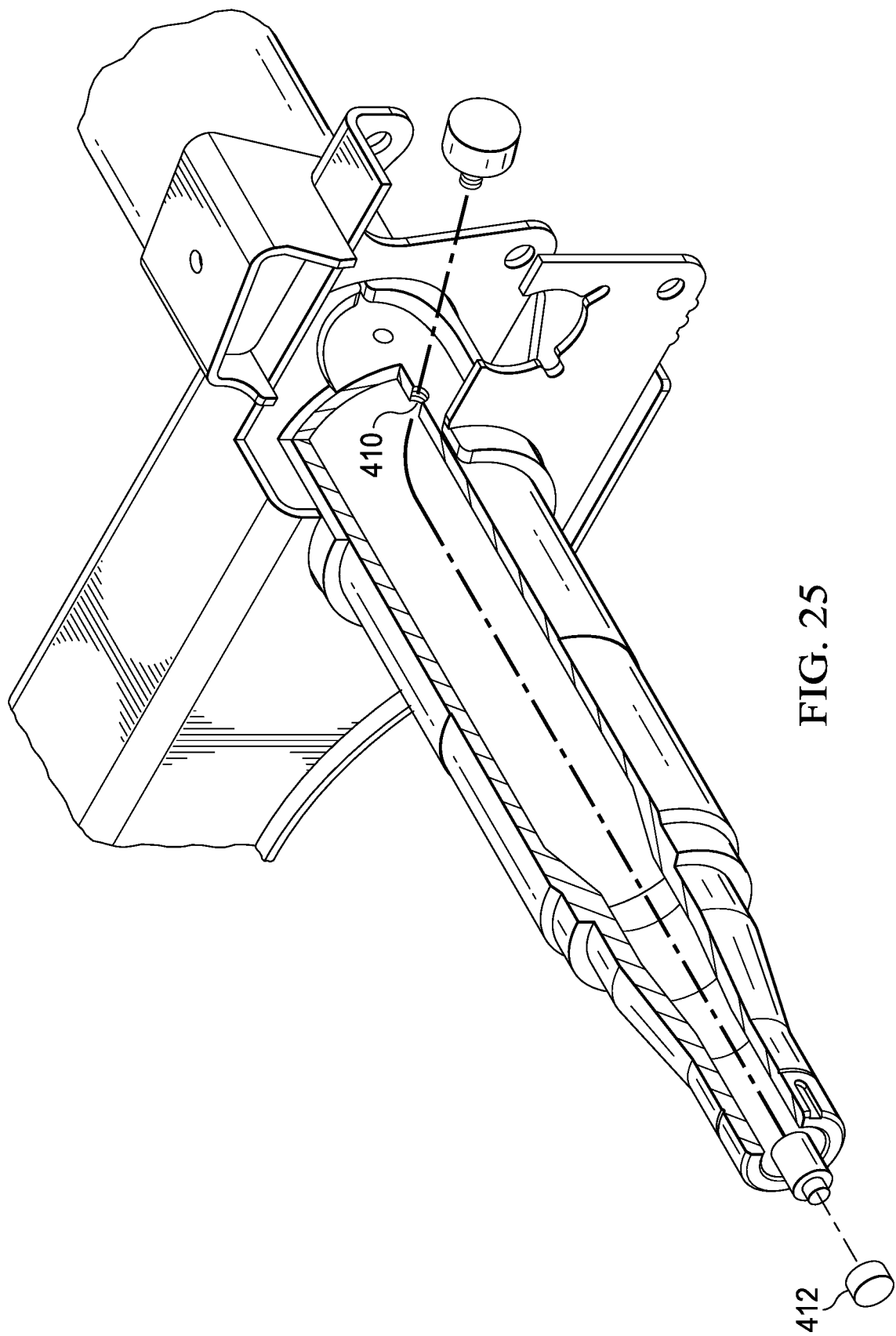
FIG. 25 illustrates an embodiment of an axle and wheel end during installation of a high-temperature warning system.

FIG. 24 shows an embodiment of a method 400 of installing a high temperature warning system. In a step 400, a hole may be drilled into an axle. Alternatively, some axles may include one or more existing holes or dedicated access points. For example, as shown FIG. 25, some axles may include or be tapped to include a ¼ inch National Standard Pipe Thread (NPT) hole 410. In a step 402, a wire, such as may be steel braided protective sheath 21 may be threaded through the tapped hole and routed through the axle. A sensor head may be attached to the wire (and threaded along with the wire) or the wire may be attached to the sensor head after threading the wire, depending on the particular design of the sensor. As shown in step 404, a sensor head may be inserted into or through either of a plug or sensor mounting plate (shown in FIG. 25 as plug or mounting plate 412). Alternatively, the sensor head may be installed into a hole, such as may be drilled into a face of a spindle or other wheel end component. In a step 406, the plug (or mounting plate) may be attached within the spindle (or other wheel end component).

While the preceding embodiments disclose a single or double temperature sensor arrangement, a plurality of sensors may be employed such that any particular area or component of the wheel end, wherein the capture of temperature data is of benefit, may have a sensor disposed at the desired location.

While some embodiments disclosed use of a thermocouple as a temperature sensor, other electrical temperature sensors may also be utilized. Such other types of sensors may include, but not be limited to, thermistors, resistance temperature detectors such as resistance thermometers silicon bandgap temperature sensors, and other temperature detection modalities or methodologies as may be known to one skilled in the art. The temperature sensors may be of contact or non-contact modalities.

In any or all of the above embodiments, the temperature sensor may be combined with or co-located within a rotary union. As many thermocouples have a probe extension on the thermocouple and many rotary unions rely on a stator that passes through the body to which the rotary union is attached, the probe and stator may be unified into a single body or a temperature probe may be attached to the stator. Alternately, a combined thermocouple and rotary union may be interdisposed such that the probe of the thermocouple passes through the center opening of the rotary union.

The inflation manifold may thus be variously embodied, and wheel end assemblies may thus be variously formed, as described in the following clauses:

Clause 1. A wheel end high-temperature warning system for a vehicle having a wheel-end assembly mounted to an axle, the system comprising a first temperature sensor including a sensor head configured for mounting within a spindle section of said axle near the wheel end assembly, the sensor head being in a heat exchange relationship with one or more bearings of the wheel-end assembly; a transmitter disposed on the axle to which the wheel-end assembly is mounted, the transmitter being configured to receive a first sensor signal from the first temperature sensor indicative of a wheel-end temperature, and transmit the signal to a receiver; and a vehicle data acquisition module coupled to said receiver, the data acquisition system being programmed to receive said first sensor signal and process the signal to determine a temperature of the spindle; the vehicle data acquisition module further including a display to provide a digital indication of said temperature and identify the particular wheel-end assembly associated with said temperature; and the data acquisition module further configured to compare said temperature to a threshold temperature and to initiate one or more alarms if said temperature exceeds said threshold temperature.

Clause 2. The wheel end high-temperature warning system of clause 1, said sensor head being mounted to any of a wall of the spindle section of the axle, an outboard end of the spindle section of the axle, a pressure barrier plug sealing the axle, or a mounting plate disposed in the axle.

Clause 3. The wheel end high-temperature warning system of clause 1, the temperature sensor being a thermocouple including a pair of wires sized in length to route a thermo-electric signal generated at said sensor head to a thermocouple reference junction, the reference junction being positioned out of heat exchange relationship with said wheel-end assembly.

Clause 4. The wheel end high-temperature warning system of clause 3, the temperature sensor comprising a steel-braided protective sheath substantially enclosing the pair of wires, the steel-braided protective sheath extending between said sensor head and said reference junction.

Clause 5. The wheel end high-temperature warning system of claim 4, said reference junction being coupled to a voltmeter, said voltmeter positioned adjacent said transmitter and mounted to said axle.

Clause 6. The wheel end high-temperature warning system of clause 1, the temperature sensor being a thermocouple, a reference junction, and a voltmeter; said voltmeter and said transmitter included in a common housing and mounted to said axle.

Clause 7. The wheel end high-temperature warning system of clause 1, said sensor head being disposed adjacent the centerline of an outer spindle end of said spindle.

Clause 8. The wheel end high-temperature warning system of clause 1 further comprising a second temperature sensor, the second temperature sensor configured to provide at least one second sensor signal, the at least one second sensor signal related to a temperature of one or more of a hub, hub lugs, brake system body, or hubcap of a vehicle.

Clause 9. The wheel end high-temperature warning system of clause 8 said data acquisition system programmed to generate one or more system alerts based on whether one or more of said first sensor signal and/or said at least one second sensor signal indicates that a wheel-end temperature exceeds a temperature threshold.

Clause 10. The wheel end high-temperature warning system of clause 8, the data acquisition system programmed to generate one or more system alerts based on a difference in temperature measured between said first temperature sensor and said second temperature sensor.

Clause 11. The wheel end high-temperature warning system of clause 1, the data acquisition system further programmed to display a tire inflation pressure.

Clause 12. The wheel end high-temperature warning system of clause 1, said axle being a fixed axle.

Clause 13. A wheel end high-temperature warning system for a vehicle having a wheel end assembly mounted to an axle, the system comprising a first temperature sensor including a sensor head configured for mounting within a wheel-end assembly of the axle, the sensor head in a heat exchange relationship with one or more bearings or brake components of the wheel-end assembly; a transmitter disposed externally to the wheel end assembly, the transmitter being configured to receive a first sensor signal from the first temperature sensor indicative of a wheel-end temperature and to transmit the first sensor signal to a receiver; a vehicle data acquisition module coupled to said receiver, the data acquisition system being programmed to receive said first sensor signal and process the signal to determine a temperature; the vehicle data acquisition module further including a display to provide a digital indication of said temperature and identify the particular wheel-end assembly associated with said temperature; the data acquisition module further configured to compare said temperature to a threshold temperature and to initiate one or more alarms if said temperature exceeds said threshold temperature.

Clause 14. The wheel end high-temperature warning system of clause 13, said sensor head being mounted to either of a wall of a spindle section of said axle, an outboard spindle end, a pressure barrier plug, or a mounting plate, a hub, hub lugs, a brake system component, or a hubcap.

Clause 15. The wheel end high-temperature warning system of clause 13, the temperature sensor being a thermocouple including a pair of wires, said pair of wires sized in length to route a thermo-electric signal generated at said sensor head to a thermocouple reference junction, the reference junction being positioned outside of said wheel-end assembly.

Clause 16. The wheel end high-temperature warning system of clause 13, the temperature sensor comprising a steel-braided protective sheath substantially enclosing the wires, the steel-braided protective sheath extending between said sensor head and said reference junction.

Clause 17. The wheel end high-temperature warning system of clause 16, said reference junction block being coupled to a voltmeter, said voltmeter positioned adjacent said transmitter and mounted externally to the wheel-end assembly.

Clause 18. The wheel end high-temperature warning system of clause 13, the temperature sensor being a thermocouple including a pair of wires, a reference junction, and a voltmeter; said voltmeter and said transmitter included in a common housing and mounted externally to the wheel-end assembly.

Clause 19. The wheel end high-temperature warning system of clause 13, said sensor head being disposed adjacent the centerline of an outer spindle face of a spindle.

Clause 20. The wheel end high-temperature warning system of clause 13 further comprising a second temperature sensor, the second temperature sensor configured to provide at least one second sensor signal.

Clause 21. The wheel end high-temperature warning system of clause 20 said data acquisition system programmed to generate one or more system alerts based on whether one or more of said first sensor signal and/or said at least one second sensor signal indicates that a wheel-end temperature exceeds a temperature threshold.

Clause 22. The wheel end high-temperature warning system of clause 20, the data acquisition system programmed to generate one or more system alerts based on a difference in temperature measured between said first temperature sensor and said second temperature sensor.

Clause 23. The wheel end high-temperature warning system of clause 13, the data acquisition system further programmed to display a tire inflation pressure.

Clause 24. The wheel end high-temperature warning system of clause 13, said axle being a fixed axle or a steer axle.

Clause 25. The wheel end high-temperature warning system of clause 13, the transmitter being disposed on one or more of the axles or on a vehicle frame.

Clause 26. The wheel end high-temperature warning system of clause 13, said axle being either of a fixed axle or a steer axle.

Clause 27. A wheel end high-temperature warning system for a vehicle having a wheel end assembly mounted to a steer axle, the system comprising a mounting block disposed on the inboard face of a spindle within a space between said spindle and the steer axle; a first temperature sensor mounted within said mounting block, the sensor head in a heat exchange relationship with one or more bearings of the wheel-end assembly; a transmitter disposed externally to the wheel end assembly, the transmitter being configured to receive a first sensor signal from the first temperature sensor indicative of a wheel-end temperature and to transmit the first sensor signal to a receiver; a vehicle data acquisition module coupled to said receiver, the data acquisition system being programmed to receive said first sensor signal and process the signal to determine a temperature; the vehicle data acquisition module further including a display to provide a digital indication of said temperature and identify the particular wheel-end assembly associated with said temperature; the data acquisition module further configured to compare said temperature to a threshold temperature and to initiate one or more alarms if said temperature exceeds said threshold temperature.

Clause 28. The wheel end high-temperature warning system of clause 27, the temperature sensor being a thermocouple said pair of wires sized in length to route a thermo-electric signal generated at said sensor head to a reference junction, the reference junction being positioned outside of said wheel-end assembly.

Clause 29. The wheel end high-temperature warning system of clause 27, the temperature sensor comprising a steel-braided protective sheath substantially enclosing the wires, the steel-braided protective sheath extending between said sensor head and said reference junction.

Clause 30. The wheel end high-temperature warning system of clause 29, said reference junction being coupled to a voltmeter, said voltmeter positioned adjacent said transmitter and mounted externally to the wheel-end assembly.

Clause 31. The wheel end high-temperature warning system of clause 27, the temperature sensor being a thermocouple, a reference junction, and a voltmeter; said voltmeter and said transmitter included in a common housing and mounted externally to the wheel-end assembly.

Clause 32. The wheel end high-temperature warning system of clause 27 further comprising a second temperature sensor, the second temperature sensor configured to provide at least one second sensor signal.

Clause 33. The wheel end high-temperature warning system of clause 32 said data acquisition system programmed to generate one or more system alerts based on whether one or more of said first sensor signal and/or said at least one second sensor signal indicates that a wheel-end temperature exceeds a temperature threshold.

Clause 34. The wheel end high-temperature warning system of clause 33, the data acquisition system programmed to generate one or more system alerts based on a difference in temperature measured between said first temperature sensor and said second temperature sensor.

Clause 35. The wheel end high-temperature warning system of clause 27, the data acquisition system further programmed to display a tire inflation pressure.

Clause 36. The wheel end high-temperature warning system of clause 27, the transmitter being disposed on said steer axle.

Clause 37. A wheel end high-temperature warning system for a vehicle having a wheel end assembly mounted to a steer axle, the system comprising a first temperature sensor mounted in a spindle of said wheel end assembly; a transmitter disposed externally to the wheel end assembly, the transmitter being configured to receive a first sensor signal from the first temperature sensor indicative of a wheel-end temperature and to transmit the first sensor signal to a receiver; a vehicle data acquisition module coupled to said receiver, the data acquisition system being programmed to receive said first sensor signal and process the signal to determine a temperature; the vehicle data acquisition module further including a display to provide a digital indication of said temperature and identify the particular wheel-end assembly associated with said temperature; the data acquisition module further configured to compare said temperature to a threshold temperature and to initiate one or more alarms if said temperature exceeds said threshold temperature.

Clause 38. The wheel end high-temperature warning system of clause 37, the temperature sensor being a thermocouple including a pair of wires, said pair of wires sized in length to route a thermo-electric signal generated at said sensor head to a reference junction, the reference junction being positioned outside of said wheel-end assembly.

Clause 39. The wheel end high-temperature warning system of clause 37, the temperature sensor comprising a steel-braided protective sheath substantially enclosing the wires, the steel-braided protective sheath extending between said sensor head and said reference junction.

Clause 40. The wheel end high-temperature warning system of clause 39, said reference junction being coupled to a voltmeter, said voltmeter positioned adjacent said transmitter and mounted externally to the wheel-end assembly.

Clause 41. The wheel end high-temperature warning system of clause 37, the temperature sensor being a thermocouple including a pair of wires, a reference junction block, and a voltmeter; said voltmeter and said transmitter included in a common housing and mounted externally to the wheel-end assembly.

Clause 42. The wheel end high-temperature warning system of clause 37 further comprising a second temperature sensor, the second temperature sensor configured to provide at least one second sensor signal.

Clause 43. The wheel end high-temperature warning system of clause 42 said data acquisition system programmed to generate one or more system alerts based on whether one or more of said first sensor signal and/or said at least one second sensor signal indicates that a wheel-end temperature exceeds a temperature threshold.

Clause 44. The wheel end high-temperature warning system of clause 43, the data acquisition system programmed to generate one or more system alerts based on a difference in temperature measured between said first temperature sensor and said second temperature sensor.

Clause 45. The wheel end high-temperature warning system of clause 37, the data acquisition system further programmed to display a tire inflation pressure.

Clause 46. The wheel end high-temperature warning system of clause 37, the transmitter being disposed on said steer axle.

Clause 47. The wheel end high-temperature warning system of any of clauses 37-47, the first temperature sensor being mounted to an exterior face of the spindle Clause 48. The wheel end high-temperature warning system of any of clauses 37-47, the first temperature sensor being mounted to the spindle, the first temperature sensor being routed through the spindle through a channel cross drilled in the spindle.

Clause 49. The wheel end high-temperature warning system of any of clauses 37-47, the first temperature sensor being mounted to the spindle, the first temperature sensor being routed through a mid-body wall of the spindle.

Clause 50. A wheel end high-temperature warning system for a vehicle having a wheel end assembly mounted to an axle, the system comprising a first temperature sensor including a sensor head configured for mounting within said wheel end assembly, the sensor head in a heat exchange relationship with one or more bearings of the wheel-end assembly; a second temperature sensor, the second temperature sensor configured to collect a second sensor signal; a transmitter disposed externally to the wheel end assembly, the transmitter being configured to receive a first sensor signal from the first temperature sensor and said second sensor signal, the transmitter configured for transmitting the first sensor signal and second sensor signal to a receiver; a vehicle data acquisition module coupled to said receiver, the data acquisition system being programmed to receive said first sensor signal and said second sensor signal and process the signals to determine each of a first temperature value measured by the first temperature signal and a second temperature value measured by the second temperature signal; the vehicle data acquisition module further including a display to provide a digital indication of said first temperature and said second temperature and to identify the particular wheel-end assembly associated with the first and the second temperatures; the data acquisition module further configured to compare one or more of said first temperature and said second temperature to one or more threshold temperatures and to initiate one or more alarms based thereof.

Clause 51. The wheel end high-temperature warning system of clause 50, said first temperature sensor being disposed at or through the outboard end of a spindle and said second temperature sensor being disposed at a mounting block on the inboard face of the spindle.

Clause 52. The wheel end high-temperature warning system of clause 51, the data acquisition system being programmed to determine a difference in temperature measured by said first temperature sensor and said second temperature sensor; the data acquisition module further configured to compare said difference to one or more thresholds and to initiate one or more alarms based thereof.

Clause 53. The wheel end high-temperature warning system of clause 51, further including a wire disposed through the interior of the spindle body, the wire connecting the first temperature sensor and the second temperature sensors.

Clause 54. The wheel end high-temperature warning system of clause 51, said first temperature sensor being disposed in a spindle of said wheel-end assembly and said second temperature sensor being disposed through a mid-body wall of the spindle.

Clause 55. The wheel end high-temperature warning system of clause 54, further including a wire connecting the first temperature sensor and the second temperature sensors.

Clause 56. A wheel end high-temperature warning system for a vehicle having a wheel end assembly mounted to an axle, the system comprising a first temperature sensor including a sensor head configured for mounting at a first position within said wheel end assembly, the sensor head in a heat exchange relationship with a bearing of the wheel-end assembly; a second temperature sensor, the second temperature sensor configured to collect a second sensor signal from a second position in the wheel-end assembly; a transmitter disposed externally to the wheel end assembly, the transmitter being configured to receive a first sensor signal from the first temperature sensor and to receive said second sensor signal, the transmitter configured for transmitting signal data derived from one or more of said first temperature sensor and said second temperature sensor; a vehicle data acquisition module coupled to said receiver, the data acquisition system being programmed to determine a difference in temperature measured by said first temperature sensor and said second temperature sensor; the data acquisition module further configured to compare said difference to one or more thresholds and to initiate one or more alarms based thereof.

Clause 57. The wheel end high-temperature warning system of clause 56, said vehicle data acquisition module configured for calculating a temperature gradient between the first temperature sensor and the second temperature sensor.

Clause 58. A wheel end high-temperature warning system for a vehicle having a wheel end assembly mounted to an axle, the system comprising a first temperature sensor disposed at or near said wheel-end assembly, the first temperature sensor in a heat exchange relationship with a bearing of said wheel-end assembly; a transmitter disposed externally to the wheel end assembly, the transmitter being configured to receive a first sensor signal from the first temperature sensor indicative of a wheel-end temperature and to transmit the first sensor signal to a receiver; said first temperature sensor being mounted to either of the outboard end of the spindle or a plug mounted within the spindle; said transmitter being mounted on an axle and located at a distance from the wheel-end assembly to avoid interference with one or more other vehicle transmitters.

Clause 59. The wheel end high-temperature warning system of clause 58, the transmitter being located about 25 inches to about 40 inches from the first temperature sensor.

Clause 60. A wheel end high-temperature warning system for a vehicle having a wheel end assembly mounted to an axle, the system comprising a first temperature sensor disposed within said wheel-end assembly, the first temperature sensor in a heat exchange relationship with a bearing of said wheel-end assembly; said first temperature sensor being mounted to either of the outboard face of the spindle or a plug mounted within the spindle; said first temperature sensor being in wired communication with a vehicle data acquisition module through the use of a weather-tight electrical connector.

Clause 61. A wheel end high-temperature warning system for a vehicle having a wheel end assembly mounted to an axle, the system comprising a first temperature sensor disposed on or within a hubcap of said wheel-end assembly and configured to collect a first sensor signal; a transmitter disposed externally to the wheel end assembly, the transmitter being configured to receive said first sensor signal via a wired connection and to transmit the first sensor signal to a receiver; a vehicle data acquisition module coupled to said receiver, the data acquisition system being programmed to receive said first sensor signal and process the signal to determine a temperature value for the wheel-end assembly; the vehicle data acquisition module further including a display to provide a digital indication of said temperature value and identify the particular wheel-end assembly associated with said temperature value; the data acquisition module further configured to compare said temperature value to a threshold temperature value and to initiate one or more alarms if said temperature exceeds said threshold temperature value.

Clause 62. The wheel end high-temperature warning system of clause 61, the first temperature sensor being mounted to either of the interior face of an outboard wall of the hubcap or an interior face of a side wall of the hubcap.

Clause 63. A wheel end high-temperature warning system for a vehicle having a wheel end assembly mounted to an axle, the system comprising a first temperature sensor disposed on or within a hubcap of said wheel-end assembly and configured to collect a first sensor signal; a transmitter disposed on said hubcap, the transmitter being configured to receive said first sensor signal via a wired connection and to transmit the first sensor signal to a receiver; a vehicle data acquisition module coupled to said receiver, the data acquisition system being programmed to receive said first sensor signal and process the signal to determine a temperature value for the wheel-end assembly; the vehicle data acquisition module further including a display to provide a digital indication of said temperature value and identify the particular wheel-end assembly associated with said temperature value; the data acquisition module further configured to compare said temperature value to a threshold temperature value and to initiate one or more alarms if said temperature exceeds said threshold temperature value.

Clause 64. The wheel end high-temperature warning system of clause 63, the first temperature sensor being mounted to either of the interior face of an outboard wall of the hubcap or an interior face of a side wall of the hubcap.

Clause 65. A wheel end high-temperature warning system for a vehicle having a wheel end assembly mounted to an axle, the system comprising a first temperature sensor disposed on or within said wheel-end assembly and configured to collect a first sensor signal; said first temperature sensor being in wired communication with a vehicle data acquisition module through the use of a automotive electrical connector; a vehicle data acquisition module coupled to said receiver, the data acquisition system being programmed to receive said first sensor signal and process the signal to determine a temperature of the spindle; the vehicle data acquisition module further including a display to provide a digital indication of said temperature and identify the particular wheel-end assembly associated with said temperature; the data acquisition module further configured to compare said temperature to a threshold temperature and to initiate one or more alarms if said temperature exceeds said threshold temperature.

Although the disclosed subject matter and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, system 18s and methods may be described with reference to a manual or manually-activated pressure reduction valve, an electric valve or other automatic electronic or mechanical valve may be used to accomplish relatively rapid reduction of fluid pressure. Accordingly, the appended claims are intended to include within their scope such processes, machines, manufacture, compositions of matter, means, methods, system or steps.

We claim:

1. A wheel end high-temperature warning system for a vehicle having a wheel-end assembly mounted to a spindle of an axle, the system comprising:
   a first temperature sensor including a sensor head mounted to a pressure barrier plug sealingly disposed within a spindle section of an axle near the wheel end assembly, the sensor head being in a heat exchange relationship with one or more bearings of the wheel-end assembly;
   a transmitter configured to receive a first sensor signal from the first temperature sensor indicative of a wheel-end temperature, and transmit the signal to a receiver; and
   a vehicle data acquisition module coupled to said receiver, the data acquisition system being programmed to receive said first sensor signal and process the signal to determine a temperature of the spindle;
   the vehicle data acquisition module further including a display to provide a digital indication of said temperature and identify the particular wheel-end assembly associated with said temperature; and
   the data acquisition module further configured to compare said temperature to a threshold temperature and to initiate one or more alarms if said temperature exceeds said threshold temperature.

2. The wheel end high-temperature warning system of claim 1, the first temperature sensor being a thermocouple including a pair of wires sized in length to route a thermoelectric signal generated at said sensor head to a reference junction, the reference junction being positioned out of a heat exchange relationship with said wheel-end assembly.

3. The wheel end high-temperature warning system of claim 2, the first temperature sensor comprising a steel-braided protective sheath substantially enclosing the pair of wires, the steel-braided protective sheath extending between said sensor head and said reference junction;
said reference junction being coupled to a voltmeter, said voltmeter positioned adjacent said transmitter and mounted to said axle.

4. The wheel end high-temperature warning system of claim 1 further comprising a second temperature sensor, the second temperature sensor configured to provide a second sensor signal, the sensor signal related to a temperature of one or more of said spindle, a hub, hub lugs, brake system body, or hubcap of a vehicle.

5. The wheel end high-temperature warning system of claim 4, the data acquisition system programmed to generate one or more system alerts based on a difference in temperature measured between said first temperature sensor and said second temperature sensor.

6. A wheel end high-temperature warning system for a vehicle having a wheel end assembly mounted to an axle, the system comprising:
a first thermocouple sensor including a sensor head, the thermocouple sensor being mounted so that the sensor head is disposed in a spindle of an axle of said vehicle;
a transmitter configured to receive a first sensor signal from the first thermocouple sensor indicative of a wheel-end temperature and to transmit the first sensor signal to a receiver;
the thermocouple sensor including a pair of wires sized in length to route a thermo-electric signal generated at said sensor head to a reference junction, the reference junction being coupled to a voltmeter, said voltmeter positioned adjacent said transmitter with both the voltmeter and transmitter mounted externally to the wheel-end assembly;
a vehicle data acquisition module coupled to said receiver, the data acquisition system being programmed to receive said first sensor signal and process the signal to determine a temperature;
the vehicle data acquisition module further including a display to provide a digital indication of said temperature and identify the particular wheel-end assembly associated with said temperature;
the data acquisition module further configured to compare said temperature to a threshold temperature and to initiate one or more alarms if said temperature exceeds said threshold temperature.

7. The wheel end high-temperature warning system of claim 6, the first thermocouple sensor comprising a steel-braided protective sheath substantially enclosing the pair of wires, the steel-braided protective sheath extending between said sensor head and said reference junction.

8. The wheel end high-temperature warning system of claim 6, said voltmeter and said transmitter included in a common housing.

9. The wheel end high-temperature warning system of claim 6 further comprising a second thermocouple sensor, the second thermocouple sensor configured to provide at least one second sensor signal;
said data acquisition system programmed to generate one or more system alerts based on a difference in temperature measured between said first thermocouple sensor and said second thermocouple sensor.

10. The wheel end high-temperature warning system of claim 6, the first thermocouple sensor being mounted to an exterior face of the spindle.

11. The wheel end high-temperature warning system of claim 6, the first thermocouple sensor being mounted to the spindle,
the first thermocouple sensor being routed through the spindle through a channel cross drilled in the spindle.

12. The wheel end high-temperature warning system of claim 6, the first temperature sensor being mounted being routed through a mid-body wall of the spindle.

13. A wheel end high-temperature warning system for a vehicle having a wheel end assembly mounted to a spindle of an axle, the system comprising:
a first temperature sensor configured for mounting to a pressure barrier plug sealingly disposed in a spindle of an axle, the first temperature sensor configured to be in a heat exchange relationship with a bearings of said wheel-end assembly;
a transmitter configured to be disposed externally to the wheel end assembly, the transmitter being configured to receive a first sensor signal from the first temperature sensor indicative of a wheel-end temperature and to transmit the first sensor signal to a receiver;
said transmitter configured for location on the vehicle at a distance from the wheel-end assembly suitable to avoid interference with one or more other vehicle transmitters.

14. The wheel end temperature assembly of claim 13, the first temperature sensor being a thermocouple comprising a sensor head and a reference junction;
the thermocouple sensor including a pair of wires sized in length to route a thermo-electric signal generated at said sensor head to said reference junction;
the sensor head being configured for mounting to the pressure barrier plug;
the reference junction being configured for mounting to the vehicle out of a heat exchange relationship with said wheel-end assembly.

15. The wheel end temperature assembly of claim 14, said reference junction being coupled to a voltmeter, said voltmeter positioned adjacent said transmitter with both the voltmeter and transmitter mounted externally to the wheel-end assembly.

16. The wheel end temperature assembly of claim 14, the sensor head being configured for threadable mounting within a port on the pressure barrier plug.

17. The wheel end temperature assembly of claim 13, further comprising a second temperature sensor, the second temperature sensor configured to provide a second sensor signal, the second sensor signal related to a temperature of one or more of said spindle, a hub, hub lugs, brake system body, or hubcap of a vehicle;
the data acquisition system programmed to generate one or more system alerts based on a difference in temperature measured between said first temperature sensor and said second temperature sensor.

* * * * *